United States Patent [19]
Yamazaki et al.

[11] Patent Number: 5,617,243
[45] Date of Patent: Apr. 1, 1997

[54] ELECTRO-OPTICAL SYSTEM AND METHOD OF DISPLAYING IMAGES

[75] Inventors: Shunpei Yamazaki, Tokyo; Yasuhiko Takemura, Kanagawa, both of Japan

[73] Assignee: Semiconductor Energy Laboratory Co., Ltd., Kanagawa-ken, Japan

[21] Appl. No.: 463,688

[22] Filed: Jun. 5, 1995

Related U.S. Application Data

[62] Division of Ser. No. 979,780, Nov. 20, 1992, Pat. No. 5,537,258.

[30] Foreign Application Priority Data

Nov. 20, 1991 [JP] Japan ................................... 3-331333
Nov. 29, 1991 [JP] Japan ................................... 3-340335

[51] Int. Cl.$^6$ ........................................................ G02F 1/33
[52] U.S. Cl. ................................... 359/309; 359/277
[58] Field of Search .................................. 359/309, 277, 359/634

[56] References Cited

U.S. PATENT DOCUMENTS

| | | | |
|---|---|---|---|
| 3,569,988 | 3/1971 | Schmidt et al. | 358/60 |
| 3,883,778 | 5/1975 | Kaji et al. | 315/205 |
| 4,720,747 | 1/1988 | Crowley | 350/231 |
| 4,739,396 | 4/1988 | Hyatt | 358/60 |
| 4,871,231 | 10/1989 | Garcia, Jr. | 359/478 |
| 4,984,015 | 1/1991 | Okino | 355/68 |
| 5,241,407 | 8/1993 | Sonehara et al. | 359/40 |

*Primary Examiner*—Georgia Y. Epps
*Assistant Examiner*—Thomas Robbins
*Attorney, Agent, or Firm*—Sixbey, Friedman, Leedom & Ferguson, P.C.; Gerald J. Ferguson, Jr.

[57] ABSTRACT

An electro-optical system such as an image display system and a method of displaying images are described. Laser beams of three primary colors are emitted from three lasers in a time sharing mode. These laser beams are directed onto the same optical path and then separately given optical information from the same optical modulating device in accordance with images of the respective primary colors. By this structure, displacement of constituent color images can be effectively avoided.

7 Claims, 16 Drawing Sheets

1/3 FRAME

1/4 FRAME

ELECTRO-OPTICAL SYSTEM AND METHOD OF DISPLAYING IMAGES

This is a Divisional application of Ser. No. 07/979,780, filed Nov. 20, 1992, now U.S. Pat. No. 5,537,258.

BACKGROUND OF THE INVENTION

1. Field of the Invention

The present invention relates to an electro-optical system and a method of displaying images. More particularly, it relates to such a device and a method of displaying color images without undesirable displacement of constituent color components.

2. Description of the Prior Art

As a prior art electric display, the cathod ray tube (CRT) such as the Braun tube has been broadly known. The CRT deflects electron beams in desired directions in order to form images on the screen. Since this mechanism is simple and capable of clear images, the CRT has prevailed for 70 or more years after the invention as a most useful display.

In recent years, along with the development of visual softs, wider screens and higher definitions are increasingly required. The CRT is not so excellent in this regard because a high vacuum is necessary for scanning electron beams. Considering the endurance of the tube, the CRT has to be formed with a heavy weight and a large size. For example, in the case of a screen with its diagonal dimmension of 30 inches, the thickness of the glass wall and the weight of the CRT are increased respectively to 1 cm or thicker and 100 kg or heavier.

In order to solve this problem, the projection display has recently been proposed and utilized. The basic mechanism of the projection display is same as that of the movie projector which was invented by Thomas Edison at the end of 19th century. In the case of the movie projector, light rays are passed through an Ag salt film and expanded to form a large size image. On the other hand, in the case of the recently developed projection display, two-dimmensional optical switches such as liquid crystal displays panel, light valve devices are utilized in place of the Ag salt film.

FIGS. 1 and 2 illustrate typical configurations of the transmission projection display and the reflection projection display respectively. The transmission projection display is provided with three liquid crystal panels 708 to 710 corresponding to three primary colors, i.e. red (R), green (G) and blue (B) which are combined and expanded in one screen as shown in FIG. 14. The alignment of the three panels and the associated optical system must therefore be made with a high accuracy, e.g. of the order of one micrometer.

In such a projection display, light rays passing through the liquid crystal panels each having a diagonal dimmension of 3 inches are projected on a 100 inches screen located 4 to 5 meters distant from the liquid crystal panels to form expanded images. A very high definition of the liquid crystal panels is therefore necessary in order to clear image without dimness.

The mechanism of forming images by the use of the projection display will be explained with reference to FIG. 1. Light rays are generated from a light source such as a metal halide lamp 701 and enters an optical system 702 in which the light rays are separated and directed onto three paths. The light rays in these paths are passed through filters 705, 706 and 707 and the liquid crystal panels 708, 709 and 710 to form images of red, green and blue and overlapped with each other by means of an optical device 713 in order to construct full color images. Numerals 703, 704, 711 and 712 designate mirrors for reflecting the light rays in the respective routes.

It is the most serious problem associated with the projection display system that a greater portion of the light energy is dissipated in the form of heat since the light rays utilized are usually white light rays which are passed through the filters to utilize only one component of the three primary colors. The projected images is therefore substantially dark and can not clearly be seen with usual indoor lighting so that when the display is used, the lighting must be made relatively dark. The use of a more powerful light source or the use of a wider band filter may increase the brightness of the projected images. A powerful light source, however, generates much heat which increases much power consumption and necessitates a particular cooling device. This is not economical. The use of a wider band filter, on the other hand, limits the color range available.

The range of qualities of color is substantially limited in the case of a liquid crystal display as compared with CRTs. FIG. 2 schematically shows the ranges of color qualities realized by means of color filters, CRTs and laser displays. The central asterisk denotes white. The greater the position departs from the white, the purer the color is. The most outer curve defines single color lights. The largest triangle defines the range of laser displays. The triangle of broken line defines the range of CRTs. The smallest triangle defines the range of displays utilizing color filters. As shown in the figure, the range of display utilizing color filters is substantially smaller than that of the CRTs and the laser displays. The colors formed by combining three primary colors are limited within the triangle having its apices of the three primary colors. In order to make more wide the range, the purity of each primary color must be improved. The purities of the primary colors in the case of color filter can be improved by limiting the band widths. The brightness of the light rays passing through the filters is, however, decreased as the band widths are made narrow. On the contrary, the range of CRTs is substantially wide as compared with the range of liquid crystal panels. This is because light emission of CRTs has sharp line spectra corresponding to optical transition of inner-shell electrons located at d orbitals and f orbitals caused by electron beams.

It may also improve the brightness of the projection display to utilize three color cold-cathode tubes as the light sources. The cold-cathode tubes are, however, not point light sources required by the projection display.

In order to solve this problem, the inventors have proposed to utilize lasers of three colors as the light sources. Laser light can be point source and monochromatic light. FIG. 3 illustrates a projection display system utilizing lasers. The system includes three beam expanders 809, 810 and 811 respectively for expanding the areas of cross sections of laser beams of three primary colors emitted from lasers 812, 813 and 814. The expanded laser beams of the three primary colors are passed through three liquid crystal panels 804, 805 and 806 in order to construct constituent images of the three colors respectively. The constituent images enter an optical system 803 in which these three images are overlapped to form a full color image. The full color image enters another expander 802 to project an expanded image on a screen 801.

The laser projection display is capable of forming a variety of colors as understood from the largest triangle in FIG. 2. In this case, the red light source, the green light source and the blue light source are respectively a He-Ne laser, a Nb:YAG laser (second harmonic waves) and an Ar+ laser. As apparent from the figure, the color varieties reproduced by the laser projection displays surpasses those realized by LCDs and even those by CRTs. The laser projection display is particularly excellent in displaying colors of the greenish group which is difficult for CRTs. The screen of the laser projection display is bright since there is substantially no absorption by filters. A cooling device is needed only for cooling the laser and the necessary power thereof is only of such an order as generally required for electric appliances or lower. Furthermore, in the case of typical solid lasers such as Nd:YAG lasers and typical gas lasers such as He-Ne lasers, Ar+ lasers, maintenance activity is facilitated or almost unnecessary.

It requires, however, intensive human efforts and highly accurate control for preparation, tuning-up and maintenance in order to form a clear full color screen by overlapping three color images without displacement. Particularly, since setting-up is influenced by moisture and temperature change, there are many problems for use in the temperate zone in which while most demand is expected therein, the variation in humidity and temperature is significant.

Particularly, whereas the monochromatic characteristic of laser beams is effectively utilized in the prior art laser projection display, no consideration is paid to other excellent characteristics such as parallel travel with little spread and facilitation of alignment of optical axes obtained therefrom. As apparent from FIG. 3, laser beams emitted from the lasers are expanded in advance and passed through the liquid crystal panels. Because of this, three laser beams having optical axes of about 3 inches, like the liquid crystal panels, have to run in the system, resulting in the most significant obstacle in the effort of designing smaller systems. Furthermore, since the three laser beams must be kept parallel, tuning-up and maintenance require human efforts even if it is somewhat lessened as compared to the case of usual projection displays. Particularly, it is significantly difficult to set up the system in order to obtain three laser beams in parallel after passing through the liquid crystal displays. In fact, it is hardly realized to construct 100 inches or wider full color screens.

Furthermore, whereas at least three liquid crystal panels are necessary in any cases, such a liquid crystal panel is expensive resulting in an increase in production cost. Still further expensive is the cost required to construct the optical system for combining three laser beams. The cost of the optical system tends to account for a greater part of the total production cost of the display system. In addition, the maintenance of the display system requires highly dexterity and therefore is very difficult not only for end users but also for retailers. Accordingly, it is required to reduce the number of optical switching panels and the complexity of turning-up.

It has been proposed for dispensing with expensive liquid crystal panels to utilize light bulbs. FIG. 4 illustrates an example of such a display system. The system utilizes a metal halide lamp 903 as a light source. Light rays emitted from the lamp 903 are reflected on a mirror 904 and form a parallel beam passing through a ultraviolet light filter 905 and an infrared light filter 908. The light beam is then partially reflected on a semi-transparent mirror 907 to form a first beam directed downward in the illustration and a transmitting beam passing through without reflection to the left direction. The transmitting beams is partially reflected by another semi-transparent mirror 909 to form a second beam directed downward and a third beam passing through without reflection. The semi-transparent mirror transmits 909 the blue component of the incident beam and reflect the red component of the beam. The first beam is then passed through a green filter 908 and reflected on a light bulb 911 associated with a display 914 such as a CRT to form a green optical image. The second beam is then reflected on a light bulb 912 associated with a display 915 to form a red optical image. The third beam is then passed through a blue filter 910 and reflected on a light bulb 913 associated with a display 916 to form a blue optical image. The three beams forming the red, blue and green images are passed through and reflected on the semi-transparent mirror 907 and expanded by means of a lense 902 to project a full color image on a screen 901.

Also in the case of the display system as illustrated in FIG. 4, highly accurate alignment is required for the optical elements associated with the display system. For example, the accuracy is of the order of 1 micrometer.

The diagonal size of the light bulbs is usually 3 to 10 inches. The images formed in the light bulbs are overlappingly projected onto the screen 901 about 4 to 5 meters distant therefrom as a full color image of 100 inches. In order not to make the color image rough or dim, the light bulbs are required to form highly definition images. Usual light bulbs are, however, formed only by laminating photoconductive thin films and electro-optical films made of such as a liquid crystal material in order to cut down the production cost. In the light bulb of this kind, photoelectrons generated by partial irradiation are dispersed, if the resistivity of the photoconductive material is not sufficiently high, resulting in formation of dim images. In order to avoid such a problem, the photoconductive is required to have such a high resistivity as the photosensitive drum of an electrostatic copier has. The product of resistance and capacitance per picture element, however, becomes too large to follow the motion of images.

Furthermore, the conductivity of such a photoconductive material has a substantially non-linear dependence on the strength of the incident light so that it is very difficult to realize finely variable densities. Particularly, since incident light onto each light bulb carries analogue optical information, it is difficult to grade the brightness or the density. Furthermore, a greater part of optical energy of the light emitted from the lamp 903 is dissipated so that the screen can not be so bright.

BRIEF SUMMARY OF THE INVENTION

It is an object of the present invention to provide a device and a method of displaying clear images without dimness.

It is another object of the present invention to provide a device and a method of displaying images in order to facilitate adjustment and setting-up.

It is a further object of the present invention to provide a device and a method of displaying images suitable for digital grading modes.

Additional objects, advantages and novel features of the present invention will be set forth in the description which follows, and in part will become apparent to those skilled in the art upon examination of the following or may be learned by practice of the present invention. The object and advantages of the invention may be realized and attained by means of the instrumentalities and combinations particularly pointed out in the appended claims.

To achieve the foregoing and other object, and in accordance with the present invention, as embodied and broadly described herein, an electro-optical system such as an image display system comprises means for separately generating light beams of a plurality of colors, e.g. three primary colors, in order that each beam propagates on a same optical path in turns, an optical device for expanding the light beams propagating on the same optical path, means for modulating the expanded light beams of the plurality of colors (the three primary colors) in accordance with optical images of the plurality of colors (the three primary colors) to be displayed, and means for projecting the modulated light beams on a screen in turns in order to display a color image corresponding to the optical images of the plurality of colors (the three primary colors). A typical method of forming a color image in accordance with the present invention comprises a step of transmitting light pulses of a plurality of colors, e.g. three primary colors, in turns along a same optical path, a step of passing the light pulses through a light modulating device, a step of controlling the light modulating device in synchronism with the transmission of the light pulses of the plurality of colors (the three primary colors) to modulate each light pulse in accordance with a component image of a full color image to be displayed of a corresponding primary, and a step of projecting the modulated light pulses onto a screen.

Namely, laser beams of three primary colors are emitted from these three lasers in a time sharing mode. These laser beams are directed onto the same optical path and then separately given optical information from the same optical modulating device in accordance with images of the respective primary colors. By this structure, displacement of constituent color images can be effectively avoided. This display system can be applied for either projector of the front-panel type or the rear-panel type.

An electro-optical system in accordance with the present invention comprises a plurality of lasers, an optical system provided for aligning laser beams as emitted from said lasers with a same axis, an optical device for expanding the laser beams aligned with said axis by said optical system, and a two-dimmensional optical switch arranged on an extension of said axis. An image projection screen is arranged on the extension of said axis. In the case where the laser beams as emitted from said lasers are polarized in one plane, a matrix device consisting of a liquid crystal panel where a side of said liquid crystal panel on which the laser beams are incident is not provided with a polarizing plate thereon may be used as the two-dimmensional optical switch. In the case where the two-dimmensional optical switch is a reflection type, visual images may be formed by directing the laser beams on the same axis to said optical switch and projecting the laser beams reflected by said optical switch onto said screen.

In accordance with another aspect of the present invention as broadly summarized above, the light pulse of each color is transmitted more than one times within one frame. This makes it easy to drive the display system in a grading mode. By utilizing a selected number of the repeated pulses, the brightness of each pixel of the image can be graded. In accordance with a preferred embodiment, the transmission of said light pulse of each color is repeated within one frame to have different pulse widths. The pulse widths are selected to be $1, 2, 4, \ldots 2^n$ in units of a shortest pulse width in order to widen the range of the grading. The number n is an integer ranging from 1 to m. In accordance with another preferred embodiment, the transmission of said light pulse of each color is repeated within one frame to have different pulse heights. The pulse heights are selected to be $1, 2, 4, \ldots 2^n$ in units of a shortest pulse height in the same manner. The number n is an integer ranging from 1 to m. This method of grading can be applied for a monochrome display.

Since laser beams of the three primary colors are directed onto the same optical path in advance of introducing optical images into the respective beams, it is not required to exactly align the central axes of the respective beams with each other as long as the propagation directions of the beams are parallel. It is relatively easy in accordance with the present invention to make the laser beams to be parallel to each other as compared with conventional projection systems in which laser beams of the three primary colors are separately passed through liquid crystal panels or reflected on light bulbs provided for the primary colors respectively. The propagation directions of laser beams tend to be dispersed by the panels or the bulbs due to refraction.

The laser beams directed to the same optical path may be expanded in advance of receiving optical images from the panel or the bulb. This expansion of the beams can be accomplished by means of a single lense rather than an expensive beam expander. This is because the beams of the three primary colors have already been overlapped on the same path.

When a liquid crystal panel is utilized to give optical images to the laser beams, the use of a coherent light such as laser beams is particularly advantageous since the planes of the polarization of the respective laser beams can be made exactly parallel. The liquid crystal panel can be provided without the polarizing plate, which would otherwise be necessary in order to polarize the incident laser beams in a particular direction suitable for operation of the liquid crystal panel, by aligning the polarization plane of the laser beams with the particular direction of the liquid crystal panel corresponding to the polarizing plate. By this structure, useless consumption of optical energy in the form of heat dissipation due to the polarizing plate can be avoided. This is not the case, however, when the liquid crystal panel is made of a dispersion liquid crystal (polymer liquid crystal), which utilize scattering of light rather than polarization for modulation of light.

When a light bulb is utilized to give optical images to the laser beams, the structure of the bulb is particularly important. Conventional light bulbs are formed by simply laminating thin films without providing any boundaries between pixels so that interference between optical images at near locations necessarily takes place unless the thin films are made of materials having high resistances. The high resistances, however, decrease the operation speed of the bulb. On the other hand, the reflective films of the bulbs are usually formed from dielectric multilayered reflective films but can not be formed from typical highly reflective materials such as metals because of the low resistances thereof. Since the reflection factor of the dielectric multilayered reflective film is not higher than 90% and the light rays which are not reflected are not absorbed by the film but reach to the underlying photoconductive film made of an amorphous silicon or CdSe semiconductor, a particular light blocking film has to be provided over the photoconductive film.

A new type of a light bulb is proposed in accordance with the present invention in order to overcome the above shortcomings of the conventional light bulb. Namely, the reflective film is made from a metal which is highly reflective and has a very small resistivity. The metal film is divided into a plurality of individual pads forming isolated pixels in the form of a matrix in order to avoid interference therebetween.

BRIEF DESCRIPTION OF THE DRAWINGS

The accompanying drawings, which are incorporated in and form a part of the invention and, together with the description, serve to explain the principles of the invention.

DETAILED DESCRIPTION OF THE PREFERRED EMBODIMENTS

Figure 1:
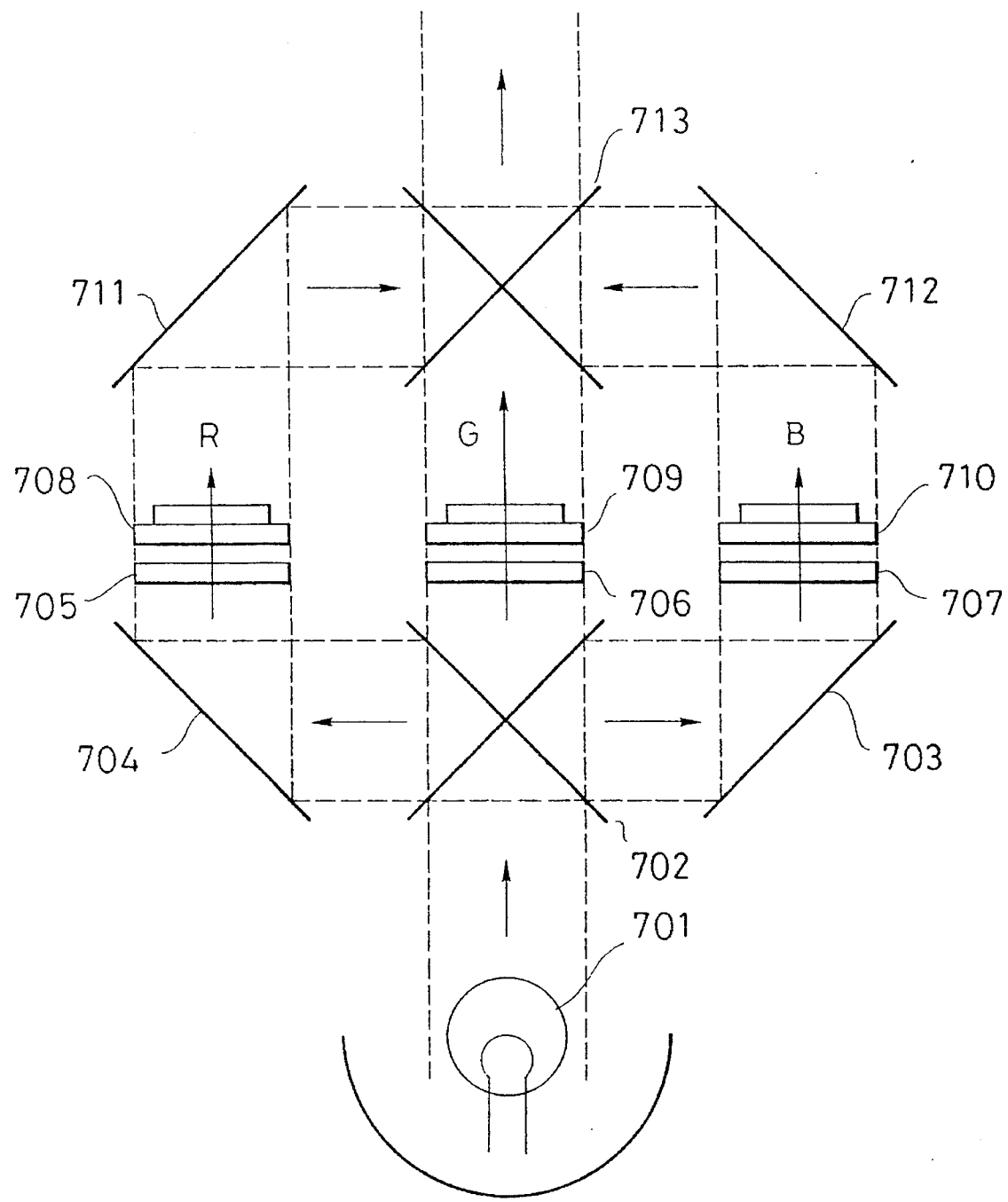
FIG. 1 is a schematic diagram showing a prior art projection display utilizing three liquid crystal panels.
Figure 2:
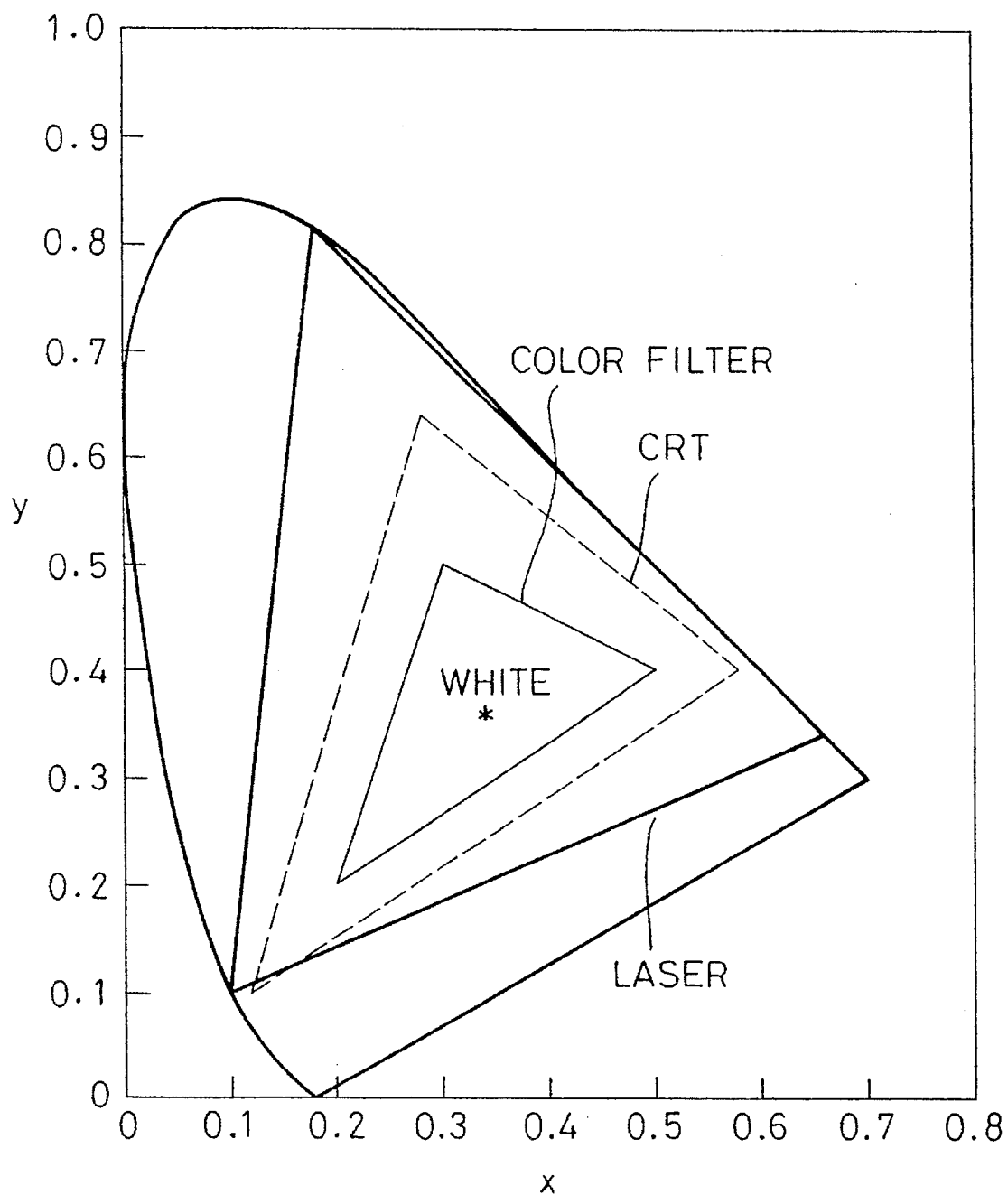
FIG. 2 is a graphical diagram showing color ranges realized by means of a CRT, a laser projection system and a display utilizing color filters.
Figure 3:
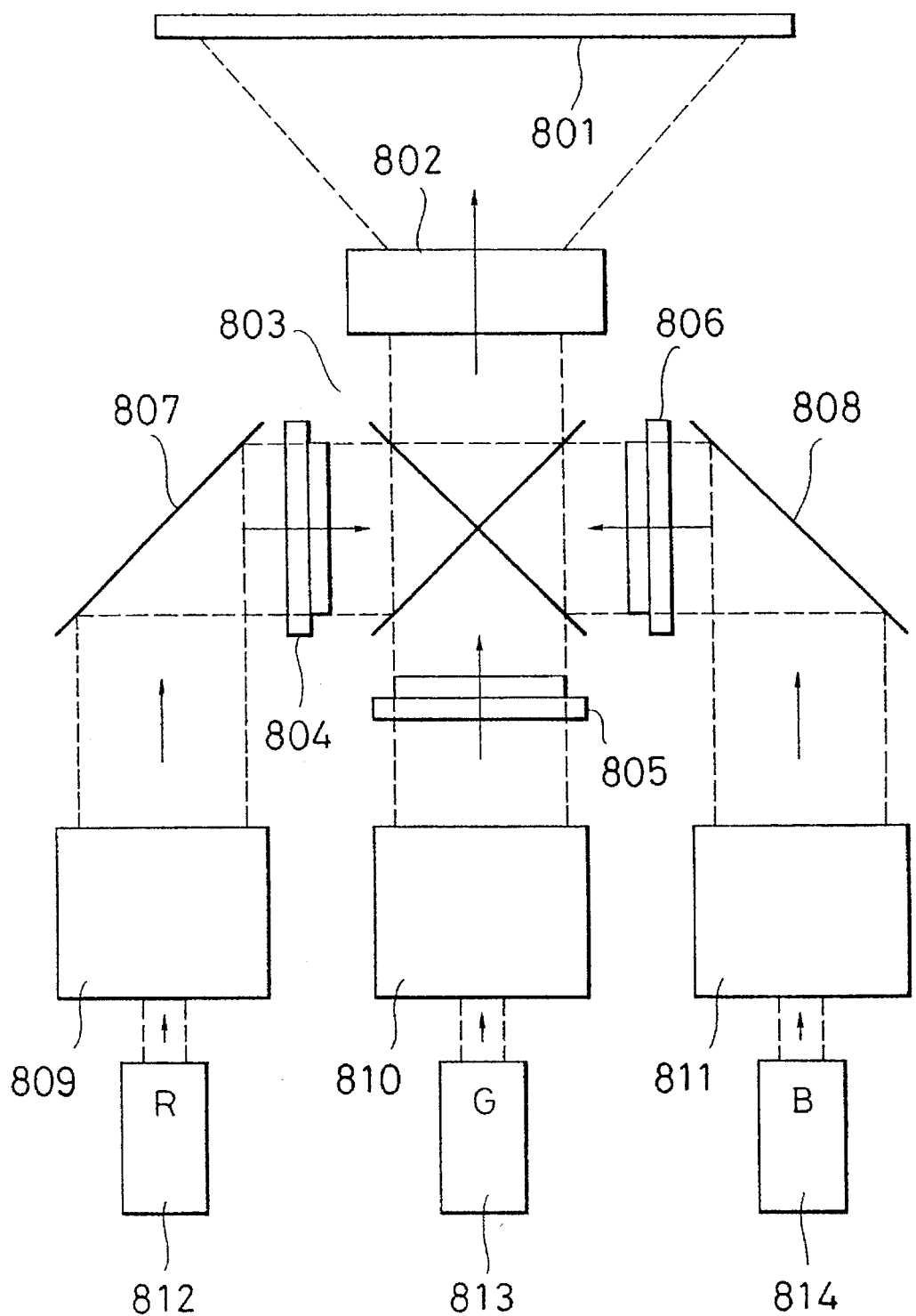
FIG. 3 is a schematic diagram showing another prior art projection display utilizing three liquid crystal panels.
Figure 4:
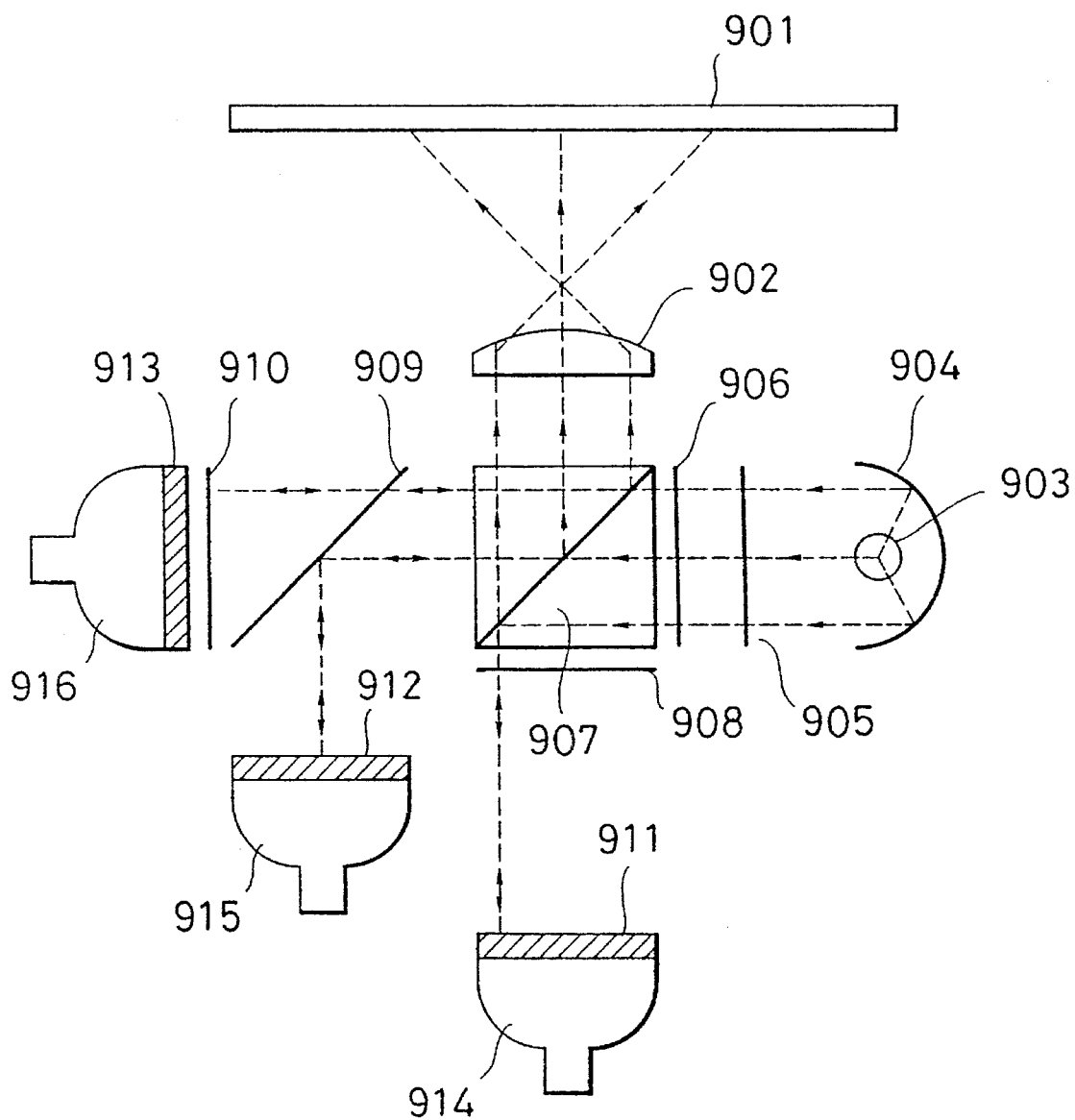
FIG. 4 is a schematic diagram showing a further prior art projection display utilizing three light bulbs.
Figure 5:
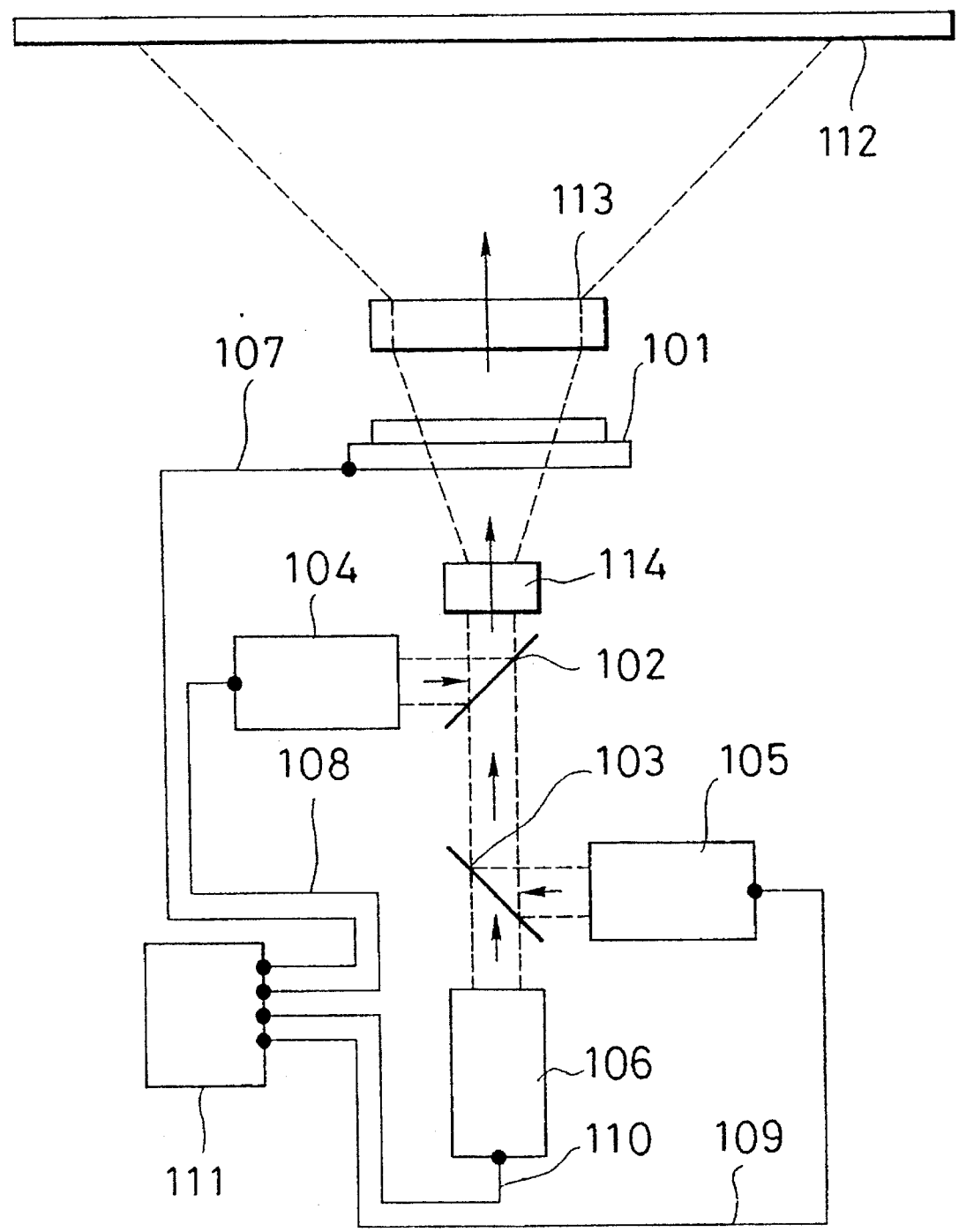
FIG. 5 is a schematic diagram showing a projection display utilizing a liquid crystal panel in accordance with a first embodiment of the present invention.

Referring now to FIG. 5, an electro-optical system such as an image display system in accordance with a first embodiment of the present invention will be explained.

The light beam generating means of the electro-optical system in accordance with the first embodiment comprises a combination of three lasers capable of emitting laser beams of three primary colors (i.e. a red laser beam, a green laser beam and a blue laser beam) and an optical system for directing the laser beams onto the same optical path.

The electro-optical system comprises a first laser 104 capable of emitting a red laser beam, a second laser 105 capable of emitting a green laser beam and a third laser 106 capable of emitting a blue laser beam. Each laser emits a pulsed sharp beam consisting of monochromatic parallel rays. Pulsed laser beams may be formed by means of an optical shatter which intermittently allow a continuous laser beam to pass therethrough. Alternatively, the lasing condition may be controlled by means of a Q-switch to emit pulsed beams. Laser beams emitted from these laser are directed onto the same optical path to have the same optical axis by means of semi-transparent mirrors 102 and 103 in order to enter an optical device in which the cross section of the beam is expanded. This expansion of the laser beams can be accomplished by means of a single lense rather than an expensive beam expander. This is because the beams of the three primary colors have already been overlapped on the same path. The expanded laser beam is then passed through a liquid crystal panel 101 of an active matrix type as a two-dimmensional optical switch and projected onto a screen 112. The planes of polarization of laser beams emitted from the three lasers are aligned in a certain direction. The direction of the liquid crystal panel 101 is selected with respect to the polarization direction of the laser beams in order to dispense with a polarizing plate, which otherwise would be necessary in the beam incident side of the liquid crystal panel to obtain polarized beams. A beam expander 113 may be optionally provided between the liquid crystal panel 101 and the screen 112 as an optical device for expanding the light beams in advance of the projection thereof. In this case, the beams expander 113 is preferably composed of a lense having a small chromatic aberration and a small curvature aberration because the beams passing therethrough contain visual images. This situation is same as in the case of usual picture projectors.

In accordance with the present invention, the formation of color images by combining three primary color images is carried out by time sharing manner. Namely, the three lasers emit a beam of the respective primary color in turn. When the laser 104 emits a red laser beam, the other laser 105 and 106 emit no beam and the liquid crystal panel 101 is controlled to pass the red laser beam therethrough to form a red color image. The laser 105 is next turned on to emit a green beam while the laser 104 halts emission and the liquid crystal panel is controlled to pass the green laser beam therethrough to form a green color image. The laser 106 is thereafter turned on to emit a blue beam while the laser 105 halts emission and the liquid crystal panel is controlled to pass the blue laser beam therethrough to form a blue color image. The lasers 104, 105 and 106 and the liquid crystal panel 101 are controlled in synchronism by means of a controller 111 through cables 107, 108, 109 and 110. The repetition of this process constructs full color images on the screen 112.

In this embodiment, each laser may be associated with a laser amplifier and/or a wavelength conversion device such as a non-linear optical device. The wavelength conversion device make it possible to utilize harmonic waves having frequencies of 2, 3 and 4 times the basic lasing frequency (second, third and fourth harmonics respectively). It is also possible by means of a suitable non-linear optical device to generate laser beams having frequencies corresponding to the difference between and the sum of different frequencies of two laser beams emitted from two lasers.

Next, a method of driving the display system will be described with reference to FIG. 8. In the figure and the subsequent description, initials G, B and R are utilized in order to identify terms relating to green, blue and red respectively. The liquid crystal panel is driven in a line sequential mode in which rows of the panel are scanned from the upper rows to the lower rows. In the figure, the curve in the right side of "pixel A" is plotted to describe the voltage applied to a pixel (pixel A) of the liquid crystal panel and the curve in the right side of "pixel B" is plotted to describe the voltage applied to another pixel (pixel B) which is located lower than the pixel A.

One frame is divided into three regions corresponding to the three primary colors respectively. The liquid crystal panel forms an image pattern of the corresponding color within each region followed by emission of a pulsed laser beams of the corresponding color. If one frame is 30 milliseconds, each region lasts for 10 milliseconds. Each pulsed laser beam desirably has a pulse width of no longer than 5 milliseconds. This is because the liquid crystal panel has to form an image pattern in advance of the emission. The rewriting of the image pattern formed in the liquid crystal panel must be performed between adjacent laser pulses. In the case that the active matrix type liquid crystal panel comprises 500 scanning lines and driven in a line sequential mode, the time necessary for processing one line is of the order of 20 microseconds. If the pulse width of the laser beams is 5 milliseconds, the time available for processing one line is only 10 microseconds. It is very difficult to completely drive an amorphous silicon semiconductor device within 10 microseconds. Of course, the pulse width of the laser beams can be increased by the use of more fast semiconductor devices.

Figure 6:
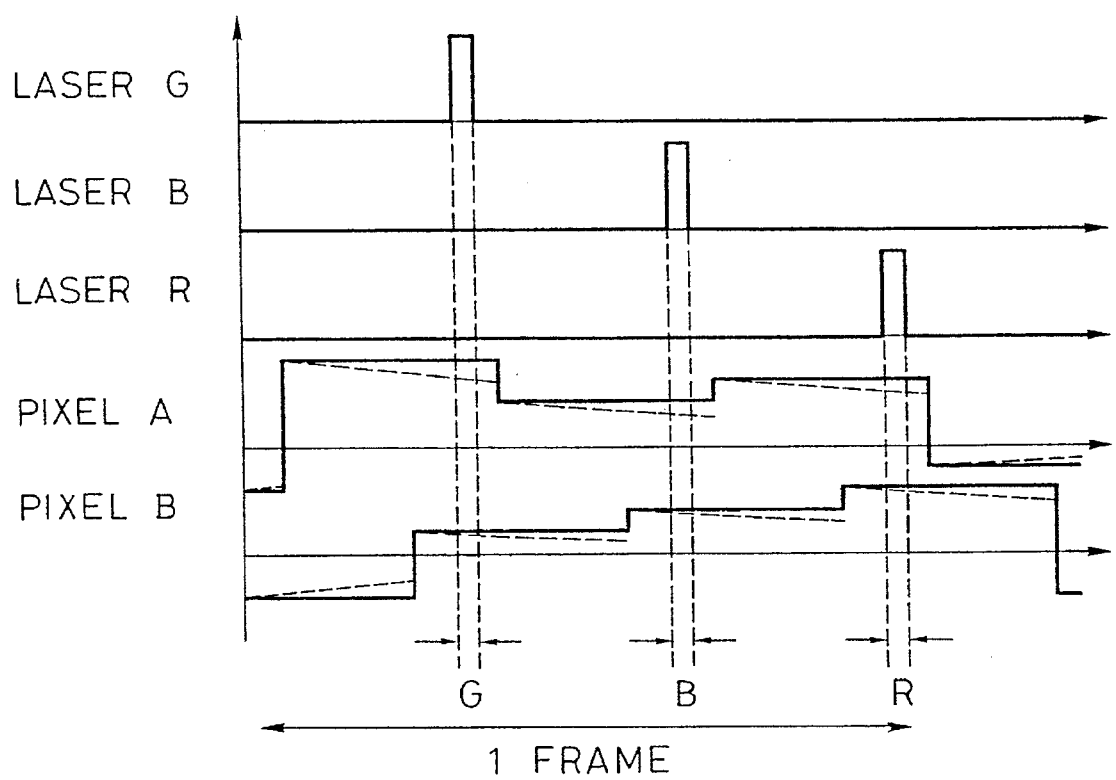
FIG. 6 is a graphical diagram showing a method of displaying color images in accordance with a first embodiment of the present invention.

The voltage applied to the pixels of the liquid crystal panel is controlled in five levels as illustrated in FIG. 6. The voltage level corresponds to the brightness of a laser beam passing therethrough. At the lowest level (level 0), the pixel is not selected to transmit no rays. In the example shown in FIG. 6, the green pulse G is passed through pixel A at level 4 and through pixel B at level 1; the blue pulse B is passed through pixel A at level 2 and through pixel B at level 2; and the red pulse R is passed through pixel A at level 3 and through pixel B at level 3. As a result, 125 types of colors can be realized by combining levels of the three primary colors. In this regard, it should be noted that the voltage levels applied to the respective pixels gradually decrease due to electric discharge as illustrated with broken lines in the figure. When the pulse G is emitted, the decrement of the voltage level at pixel A is larger than that at pixel B. This difference may be compensated by make different the voltages applied to pixels on different rows and corresponding to the same level. This method of forming graded images is called an analogue grading.

Figure 7A:
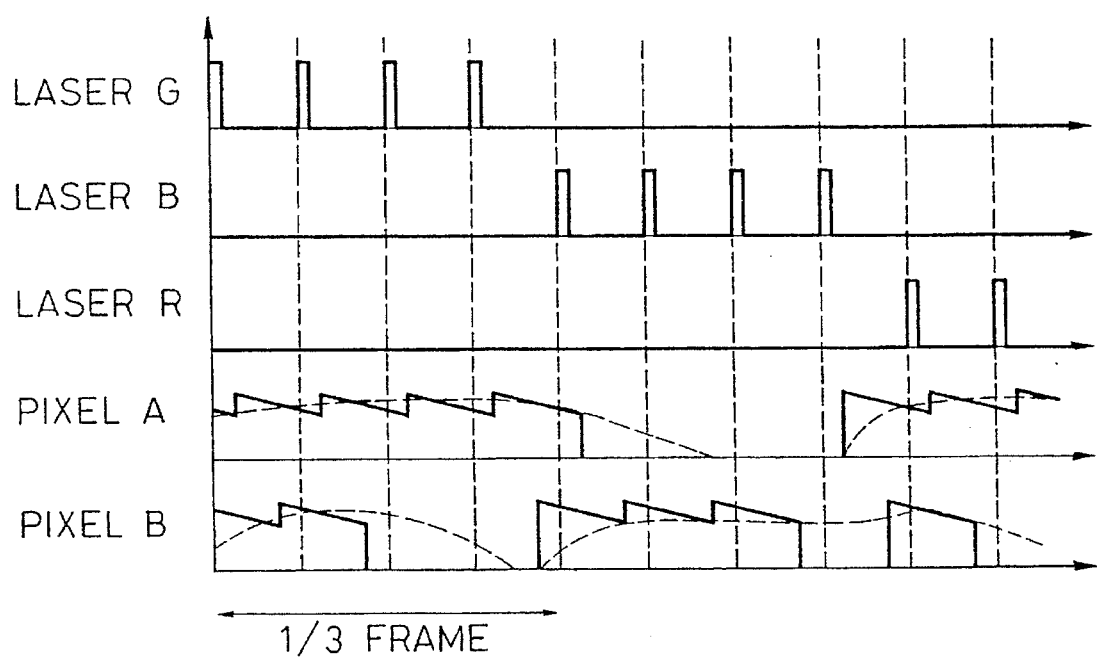
FIGS. 7(A) and 7(B) are graphical diagrams showing another method of displaying color images in accordance with the first embodiment of the present invention and a modification thereof.

FIG. 7(A) is a graphical diagram showing a digital grading. In this case, all the rows of the panel is scanned 4 times within each ⅓ frame. One laser pulse is emitted for each scanning as illustrated in the figure. Namely, four pulses are passed through the panel for each primary color within one frame. The grading is accomplished by activating a respective pixel to pass therethrough a selected number of the four pulses of a respective one of the primary colors. In this case, the green pulse G is passed 4 times through pixel A and twice through pixel B; the blue pulse B is passed once through pixel A and 3 times through pixel B; and the red pulse R is passed 3 times through pixel A and once through pixel B. As a result, 125 types of colors can be realized by combining the selected numbers of passed pulses of the three primary colors. In this regard, it should be also noted that the voltage levels applied to the respective pixels gradually decrease due to electric discharge as illustrated with broken lines in the figure.

Figure 7B:
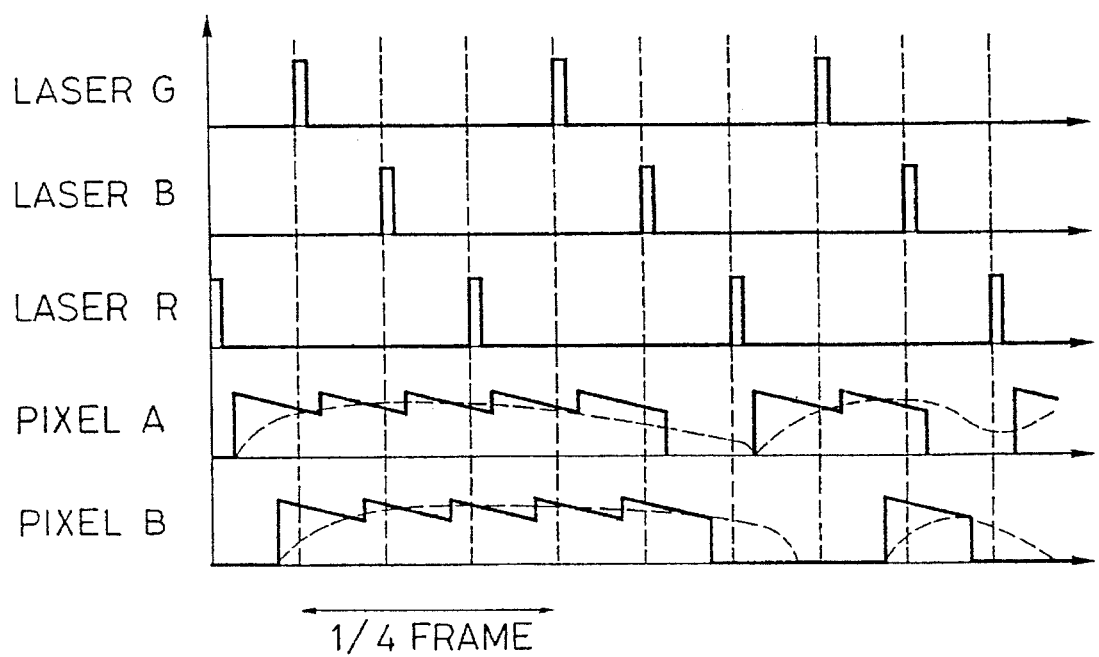

FIG. 7(B) is a graphical diagram showing a modification of the digital grading technique shown in FIG. 7(A). In this case, all the rows of the panel is scanned 3 times within each ¼ frame during which laser beams G, B and R are emitted in turn as illustrated in the figure. Namely, four pulses are passed through the panel for each primary color within one frame. The grading is accomplished by activating a respective pixel to pass therethrough a selected number of the four pulses of a respective one of the primary colors. In this case, the green pulse G is passed 4 times through pixel A and twice through pixel B; the blue pulse B is passed once through pixel A and 3 times through pixel B; and the red pulse R is passed 3 times through pixel A and once through pixel B. As a result, 125 types of colors can be realized by combining the selected numbers of passed pulses of the three primary colors in the same manner.

The grading technique has been detailedly discussed in Japanese Patent Applications Nos. Hei3-157502 and Hei3-157603 to Hei3-157607 of the same assignee. If a liquid crystal panel having 500 rows is driven with 16 grades to from one frame (image) within 30 milliseconds, one row must be processed within 1.25 microseconds so that polysilicon or CdSe thin film transistors are necessary because amorphous silicon thin film transistors can no longer follow such a high speed operation.

Anyway, it is noted that if a liquid crystal panel having 500 rows is driven with 18 grades to form 30 frames within one second, there is available only 2.5 milliseconds duration between adjacent laser pulses for controlling the liquid crystal panel. In the case of liquid crystal panels utilizing slow liquid crystal materials responsive to the change of the applied voltage at a low speed such as super-twisted nematic (STN) liquid crystals, twisted nematic (TN) liquid crystals, the liquid crystal panel can no longer follow the applied signals so that the voltage levels at pixels become dull as depicted with broken lines in FIGS. 7(A) and 7(B). In this case, the voltage level at a pixel is influenced not only by the signal applied thereto during the current scanning but also by the signal applied thereto during the preceding scanning. Particularly, if the preceding scanning is performed for a different color, undesirable mixture of colors may occur as being significant in the technique shown in FIG. 7(B).

This problem can be solved by decreasing the operational speed to a level which can be followed by a liquid crystal panel or by utilizing more fast liquid crystal materials such as ferroelectric liquid crystal materials, antiferroelectric liquid crystal materials. The decrease of the operational speed, however, means the decrease of the number of grades and the deterioration of the quality of images. Ferroelectric liquid crystal materials can follow signals applied for forming one frame with 64 grades within 30 milliseconds, in which case the space duration between adjacent pulses is only 150 microseconds. If more fast operation is desired, another material having more quick response must be sought.

Figure 8A:
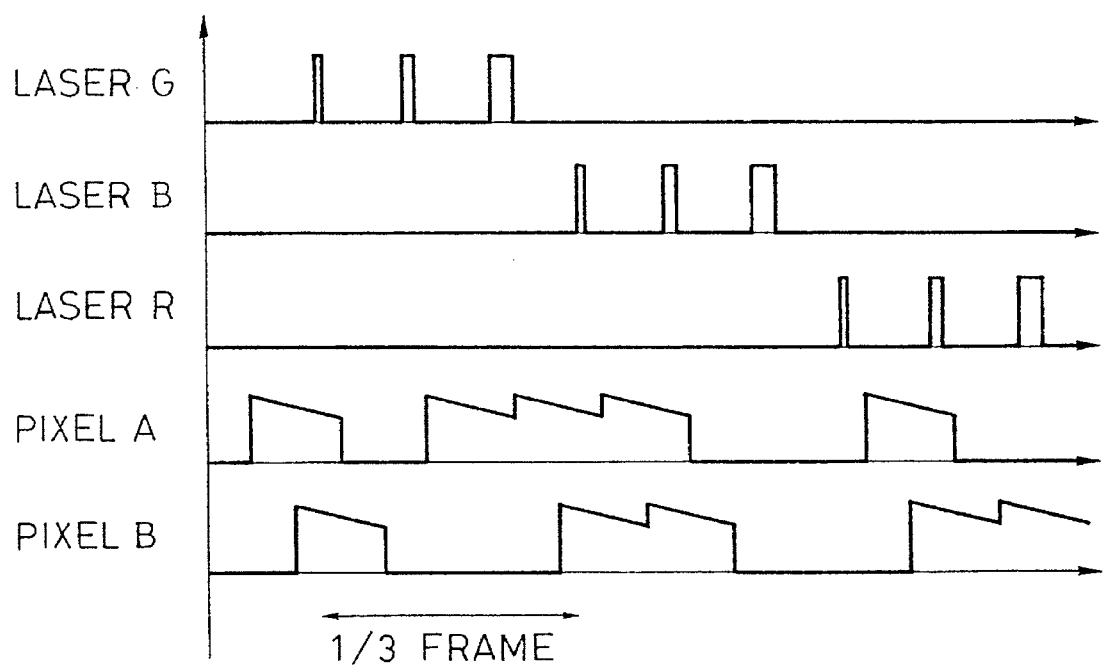
FIGS. 8(A) and 8(B) are graphical diagrams showing a further method of displaying color images in accordance with the first embodiment of the present invention and a modification thereof.

FIG. 8(A) is a graphical diagram showing another digital grading technique. In this technique, by means of an electro-optical system comprising a laser capable of emitting pulsed laser beams and a two-dimmensional optical switch, graded images are formed by periodically changing the pulse width of the laser beams. In this case, all the rows of the panel is scanned 3 times within each ⅓ frame. One laser pulse is emitted for each scanning as illustrated in the figure. Namely, three pulses are passed through the panel for each primary color within one frame. The pulse widths of the three pulses, however, are selected to be in the ratio of 1:2:4. The grading is accomplished by activating a respective pixel to selectively pass each pulse therethrough. Namely, the total pulse width of laser pulses of each primary color can be arbitrarily obtained by combining three pulses from 0 to 7 in units of the width of the shortest pulse. In this case, the green pulse G is passed for 5 time units through pixel A and for one time unit through pixel B; the blue pulse B is passed for 3 time units through pixel A and for 3 time units through pixel B; and the red pulse R is passed for 2 time units through pixel A and for 6 time units through pixel B. As a result, 512 types of colors can be realized by combining the selected numbers of passed pulses of the three primary colors. The different pulse widths may be generally determined in order to be in the ratio of $1:2:2^2:2^4, \ldots 2^{n-1}:2^n$.

Figure 8B:
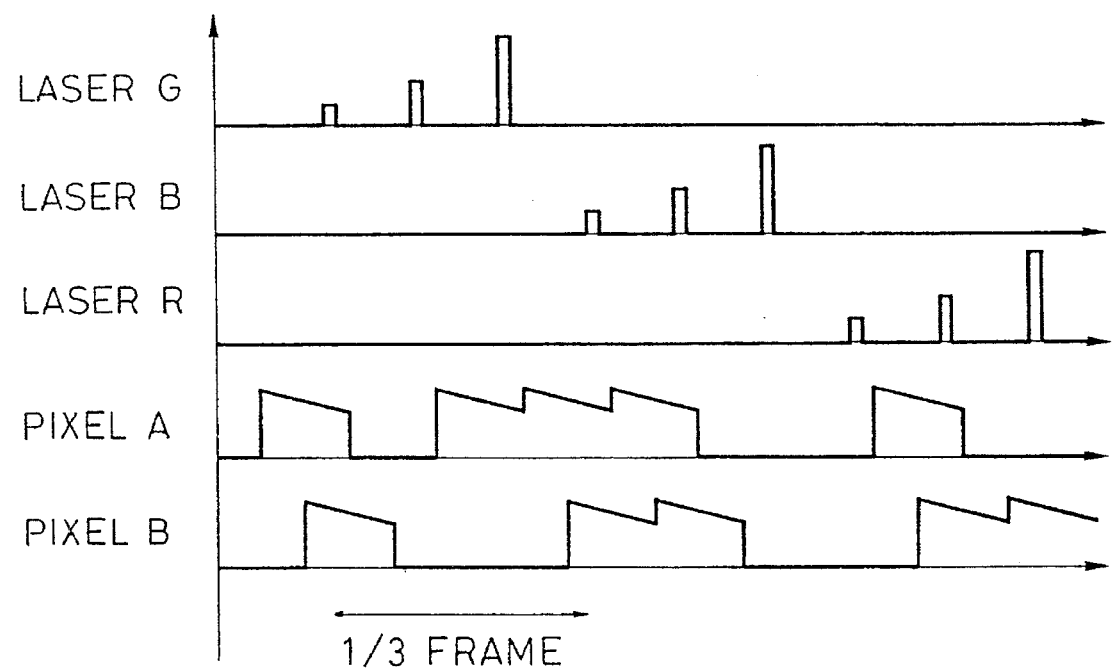

FIG. 8(B) is a graphical diagram showing a modification of the digital grading technique shown in FIG. 8(A). In the modification, by means of an electro-optical system comprising a laser capable of emitting pulsed laser beams and a two-dimmensional optical switch, graded images are formed by periodically changing the pulse height of the laser beams. In this case, the pulse heights of the three pulses, rather than the pulse widths, are selected to be in the ratio of 1:2:4. The effects and the performance are same as the previous example and therefore dispensed with. The different pulse heights may be generally determined in order to be in the ratio of $1:2:2^2:2^4, \ldots 2^{n-1}:2^n$.

It is very difficult to control the laser to emit pulses having different pulse widths or different pulse heights so that some auxiliary optical devices such as liquid crystal devices may be provided for this purpose. The optical device, however, is preferably not disposed in the resonating space of the laser. This is because whereas the laser resonation is hardly amplified in a translucent condition, the resonation is rapidly amplified once initiated in a transparent condition. For example, the energy of a laser ray is increased by a factor of 10 during one repetition of reflection between the ends of the lasing space. If the optical device does not realize a highly transparent condition, heat is concentrated in the device and destruct it by high temperatures. Accordingly, such an optical device is provided out of the lasing space. In this case, since it is difficult to utilize pulsed emission of the laser from the operation reason, the laser is driven to emit a continuous laser beam. The duty ratio of the laser pulses is therefore desirably increased.

On the other hand, when the pulse height is changed, an optical device is provided also out of the resonating space. For example, there may be provided in series five electro-optical devices each having a transmission factor in its on-condition which is double the transmission factor in its off-condition. The pulse height (the total transmission factor) is then controlled by selectively turning on or off the five electro-optical devices in 6 steps, i.e. 1, ½, ¼, ⅛, 1/16, 1/32. 64 grades are realized by the 6-steps pulse height. In this case, the electro-optical device can be formed from a material whose transparency is relatively low such as a liquid crystal material. If the laser is driven by pulsed resonation or by means of a Q-switch, the generated laser rays can be efficiently utilized except for those hindered by the electro-optical devices.

Figure 9:
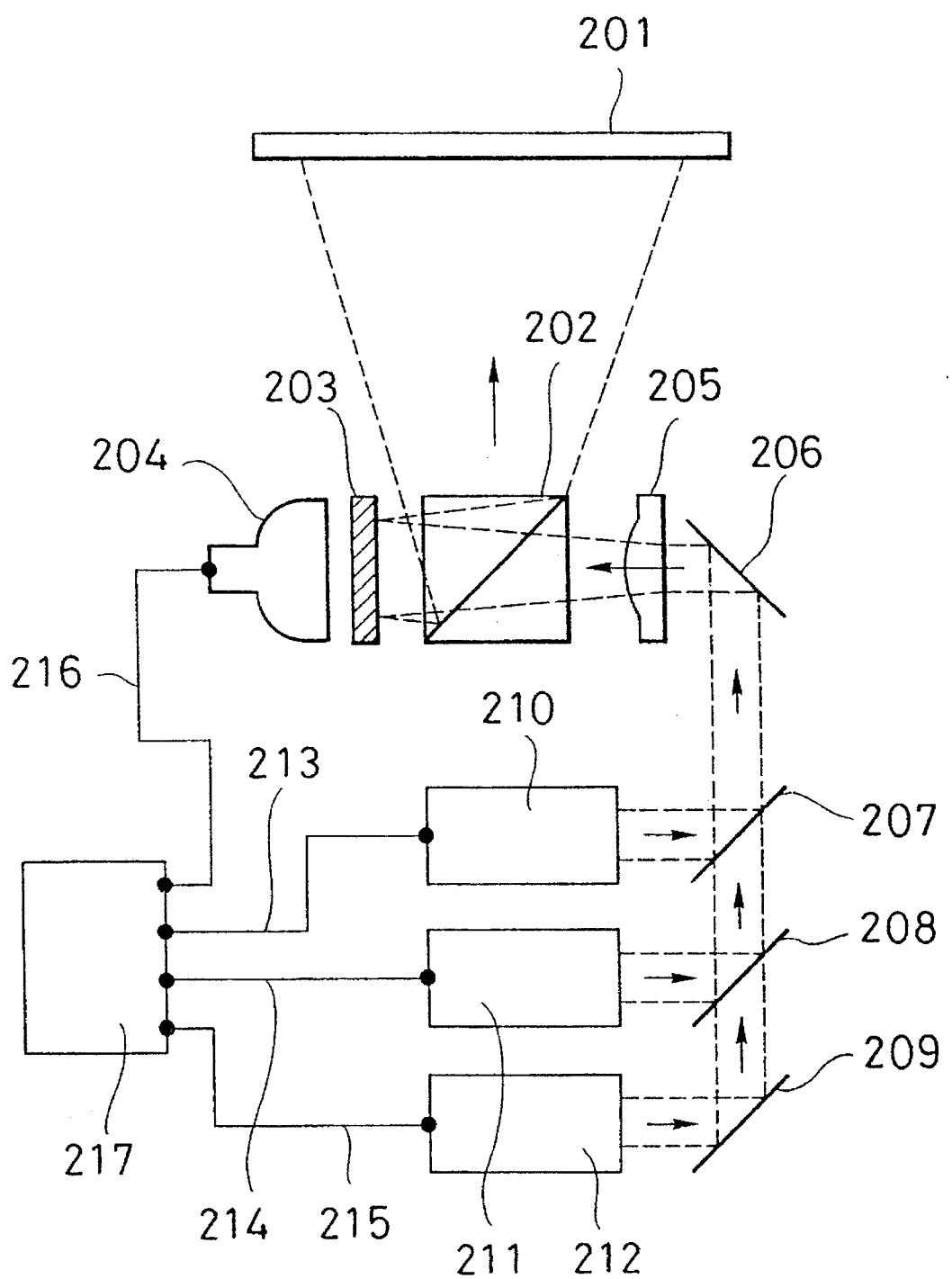
FIG. 9 is a schematic diagram showing a projection display utilizing a liquid bulb in accordance with a second embodiment of the present invention.

Referring now to FIG. 9, an image display system in accordance with a second embodiment of the present invention will be explained.

The system comprises a first laser 210 capable of emitting a red laser beam, a second laser 211 capable of emitting a green laser beam and a third laser 212 capable of emitting a blue laser beam. Each laser emits a pulsed sharp beam consisting of monochromatic parallel rays. Pulsed laser beams may be formed by means of an optical shatter which intermittently allow a continuous laser beam to pass therethrough. Alternatively, the lasing condition may be controlled by means of a Q-switch to emit pulsed beams. Laser beams emitted from these laser are directed onto the same optical path to have the same optical axis by means of a total reflection mirror 209 and semi-transparent mirrors 207 and 208 in order to enter via a total reflection mirror 206 an optical device 205 in which the cross section of the beam is expanded. The optical device 205 may be a single lense rather than sophisticated optical systems employed in prior art projection systems since the laser beams transmitted therethrough include no optical images therein. The expanded laser beam is then passed through an optical device 202 comprising a semi-transparent mirror and reflected on a light bulb associated with a CRT 204 and projected onto a screen 201 through the semi-transparent mirror 202. A beam expander may be optionally provided between the optical device 202 and the screen 201. In this case, such a beam expander is preferably composed of a lense having a small chromatic aberration and a small curvature aberration because the beams passing therethrough contain visual images. This situation is same as in the case of usual picture projectors.

In accordance with the present invention, the formation of color images by combining three primary color images is carried out by time sharing manner. Namely, the three lasers emit a beam of the respective primary color in turn. When the laser 210 emits a red laser beam, the other laser 211 and 212 emit no beam and the liquid crystal panel 203 is controlled to pass the red laser beam therethrough to form a red color image. The laser 211 is next turned on to emit a green beam while the laser 210 halts emission and the liquid crystal panel is controlled to pass the green laser beam therethrough to form a green color image. The laser 212 is thereafter turned on to emit a blue beam while the laser 211 halts emission and the liquid crystal panel is controlled to pass the blue laser beam therethrough to form a blue color image. The lasers 210, 211 and 212 and the CRT 204 are controlled in synchronism by means of a controller 217 through cables 213, 214, 215 and 218. The repetition of this process constructs full color images on the screen 201.

Figure 10A:
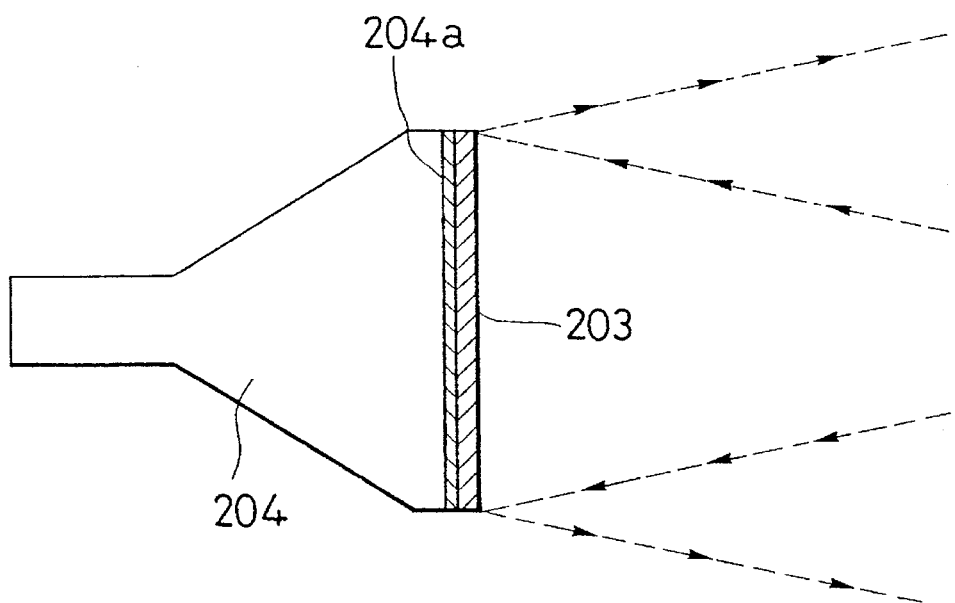
FIGS. 10(A) and 10(B) are schematic diagrams showing the light bulb employed in accordance with a second embodiment of the present invention.
Figure 10B:
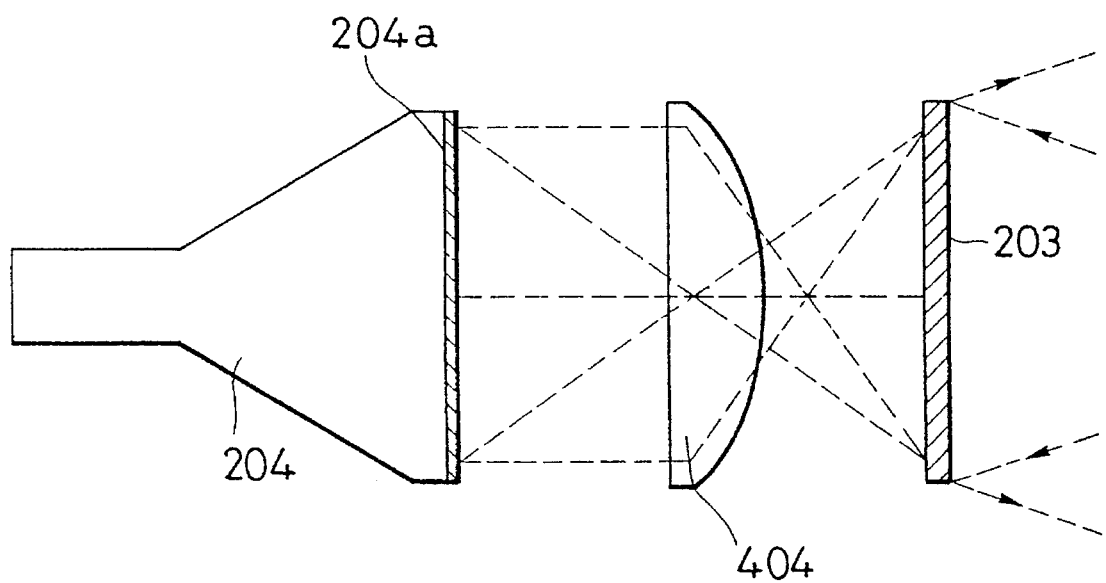

The light bulb 208 is required to have a high response speed to the variation of the inputted optical image from the CRT 204. The response speeds of conventional light bulbs, however, are relatively low as compared with that required in high graded display systems formed in accordance with the present invention. The light bulb 203 may be directly attached to the fluorescence screen 204a of the CRT 204 as illustrated in FIG. 10(A). In this case, since there is an intervening layer such as a glass wall between the light bulb 203 and the fluorescence screen 204a, images can sometimes not be formed sharply. Alternatively, the light bulb 203 may be coupled with the fluorescence screen 204a of the CRT 204 through an optical device 404 as illustrated in FIG. 10(B). In this case, clear images be formed sharply. The optical device 404, however, increase the size of the system.

Figure 11A:
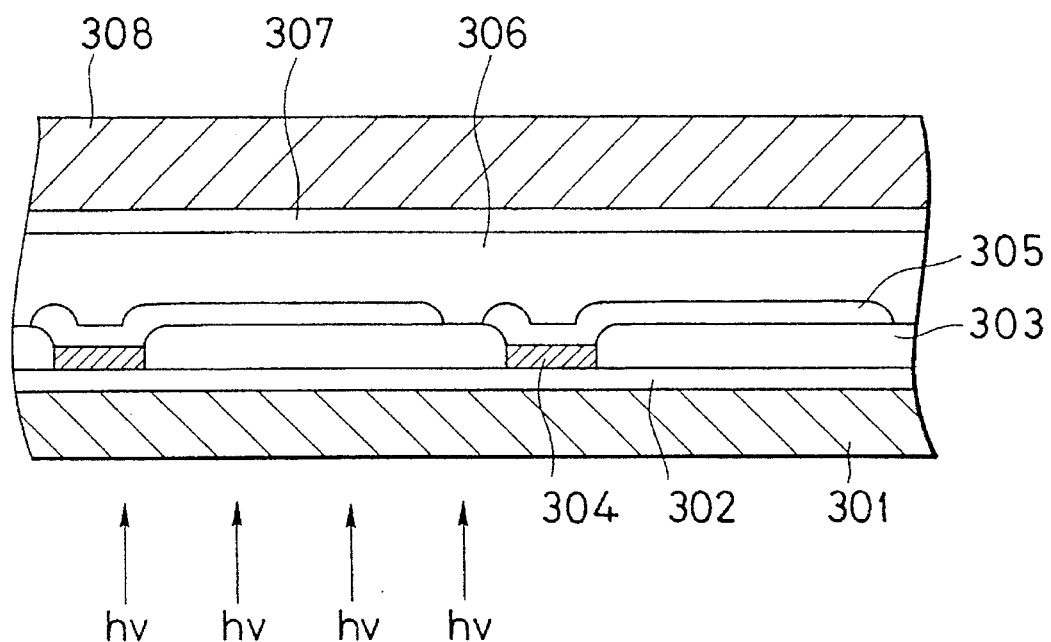
FIGS. 11(A) and 11(B) are a cross sectional diagram and a plan view showing the inner structure of the light bulb employed in accordance with a second embodiment of the present invention.
Figure 11B:
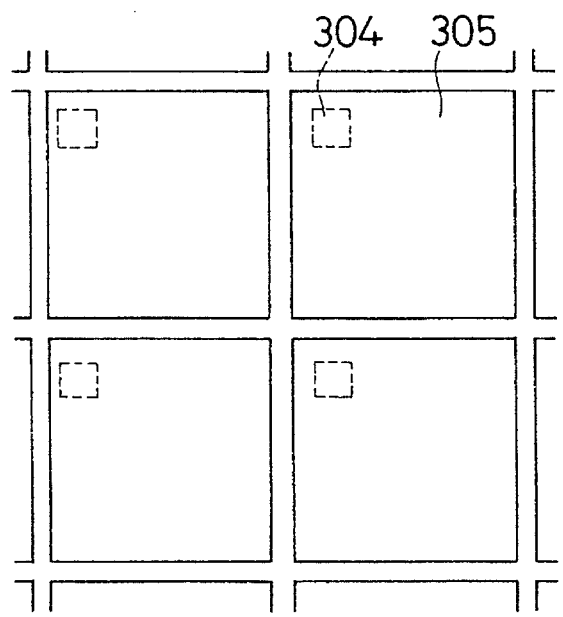

FIG. 11(A) is a cross sectional view showing a light bulb suitable for use in the display system in accordance with the present invention. The bulb comprises a pair of glass substrates (transparent substrates) 301 and 308 whose inside surfaces are provided with transparent conductive films 302 and 307 formed from ITO. A number of photoconductive elements 304 are formed on the transparent conductive film 302 and arranged in a rectangular array corresponding to the respective pixels as illustrated in FIG. 11(B) showing a plan view of the substrate 301. An insulating material is formed between the respective photoconductive elements 304 in order to isolate each element 304 from others. A number of individual rectangular metallic pads 305 isolated from each other and having reflective surfaces, e.g. made of aluminum, are then formed over the structure in a rectangular array corresponding to the respective pixels and electrically coupled respectively to the photoconductive elements 304 as illustrated in FIG. 11(B). The substrate 301 is then joined with the other substrate 308 with a liquid crystal material 308 therebetween. If the liquid crystal material is a TN, STN or ferroelectric liquid crystal material, the inside surfaces of the substrate contiguous to the liquid crystal material have to be given orientation treatment. For example, orientation control films have to be formed on the inside surfaces. If the liquid crystal material is a dispersion type (polymer) liquid crystal material, however, such treatment is not necessary.

Liquid crystal panels (LCD) or plasma display (PDP) may be employed in place of the CRT 204. The LCD, the PDP or the CRT serves as a display for separately directing optical images of the plurality of colors to a first surface of said light bulb in synchronism with the operation of the light beams generating means. Such flat panel displays are suitable for designing a compact projection display. In the case of a liquid crystal panel, a cheaper simple matrix type panel can be used as well as an expensive active matrix type panel. Active matrix type liquid crystals, however, are particularly advantageous to form high quality images, like PDPs, since they have higher response speeds.

The light bulb is operated as follows. A suitable voltage is applied between the transparent conductive films 302 and 307 during the operation of the bulb. Some of the photoconductive elements 304 are exposed to light emitted from the CRT in accordance with an image to be displayed as depicted with arrows hv, and then become conductive so that the voltage levels corresponding metallic pads 305 become equal to the voltage level of the transparent conductive film 302 by accumulating electric charge in a capacitance formed between each exposed photoconductive element and the transparent conductive film 307. The accumulated electric charge remains even after the illumination from the CRT is removed from the pixel. The liquid crystal material 306 becomes transparent due to the voltage between the photoconductive element and the transparent conductive film 307 and transmits laser beams therethrough without scattering or absorption to the surface of the metallic pad. As a result, laser rays incident onto the light bulb are reflected only on the metallic pads corresponding to the pixels where the photoconductive elements 304 receive light from the CRT. The latent image on the light bulb is cleared by making zero the differential voltage between the conductive films 302 and 307 because the electric charge accumulated in the metallic pads is gradually discharged through the photoconductive elements whose dark resistance is not infinite. If the electric charge is desired to be more positively removed, the entirety of the light bulb is exposed to illumination with the conductive films 302 an 307 being short-circuited. If necessary, either of the conductive films 302 and 307 is made in the form of individual stripes extending along the row direction. The stripes are scanned in synchronism with scanning by the CRT in the column direction.

The CRT 204 may be replaced by a TN or STN liquid crystal panel of an active matrix type associated with a back light. In the case that the light bulb is associated with a CRT, the ratio of the dark resistance to the light resistance of the photoconductive elements is preferably no lower than $10^3$. Particularly, if the luminous time is short, a larger value of the ratio is desired. In the case that the luminous time is relatively large or the CRT is replaced by a display operated in a line sequential mode such as a liquid crystal display (LCD) or a plasma display (PDP), the ratio of the dark resistance to the light resistance of the photoconductive elements may be lower than $10^3$.

Figure 12:
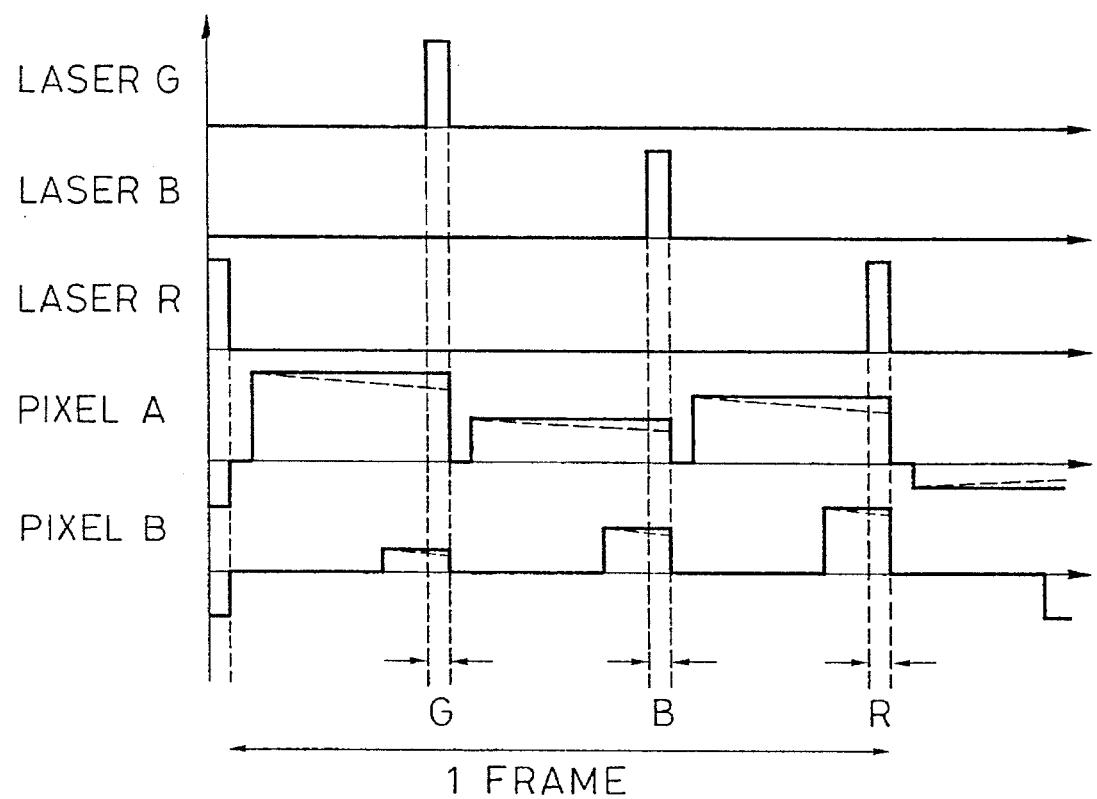
FIG. 12 is a graphical diagram showing a method of displaying color images in accordance with a second embodiment of the present invention.

Next, a method of driving the display system in accordance with the second embodiment of the present invention will be described with reference to FIG. 12. In the figure and the subsequent description, initials G, B and R are utilized in order to identify terms relating to green, blue and red respectively. The liquid crystal panel is driven in a line sequential mode in which rows of the panel are scanned from the upper rows to the lower rows. In the figure, the curve in the right side of "pixel A" is plotted to describe the voltage at the metallic pad corresponding to a pixel (pixel A) of the liquid crystal panel and the curve in the right side of "pixel B" is plotted to describe the voltage at the metallic pad corresponding to another pixel (pixel B) which is located lower than the pixel A.

One frame is divided into three regions corresponding to the three primary colors respectively. The light bulb forms an image pattern within each region followed by emission of a pulsed laser beams of the corresponding color. The emission of the pulsed laser beam is performed at the end of the scanning and, in advance of the subsequent scanning, the entirety of the light bulb is exposed to illumination with the conductive films 302 an 307 being short-circuited in order to ground the metallic pads as shown in FIG. 12.

The voltage at the metallic pad corresponding to each pixel varies in five levels in accordance with the intensity of the CRT as illustrated in FIG. 8. The voltage level corresponds to the brightness of the reflected laser beam. At the lowest level (level 0), the pixel is not selected. In the example shown in FIG. 12, the green pulse G is reflected on pixel A at level 4 and on pixel B at level 1; the blue pulse B is reflected on pixel A at level 2 and on pixel B at level 2; and the red pulse R is reflected on pixel A at level 3 and on pixel B at level 3. As a result, 125 types of colors can be realized by combining levels of the three primary colors. In this regard, it should be noted that there is variation of the voltage levels from pixel to pixel and that the voltage levels at the respective pixels are gradually changed due to several causes so that appropriate correction is required. For example, the time elapsed after the photoconductive element is illuminated until a laser pulse is reflected at pixel is longer than that at pixel B so that the increase in voltage at pixel A is greater than that at pixel A because the voltage applied between the conductive films is maintained during scanning. In the case that stripes are formed in place of one of the conductive films and scanned by supplying the voltage thereto in synchronism with the line sequential scan, the voltage drop at pixel A due to electric discharge is larger than that at pixel B as illustrated with broken lines in the figure. For this reason, a higher ratio of the dark resistance to the light resistance is desired. The ratio is usually required to exceed the number of the rows, e.g. 1000 or more in the case having 1000 or more rows.

Figure 13:
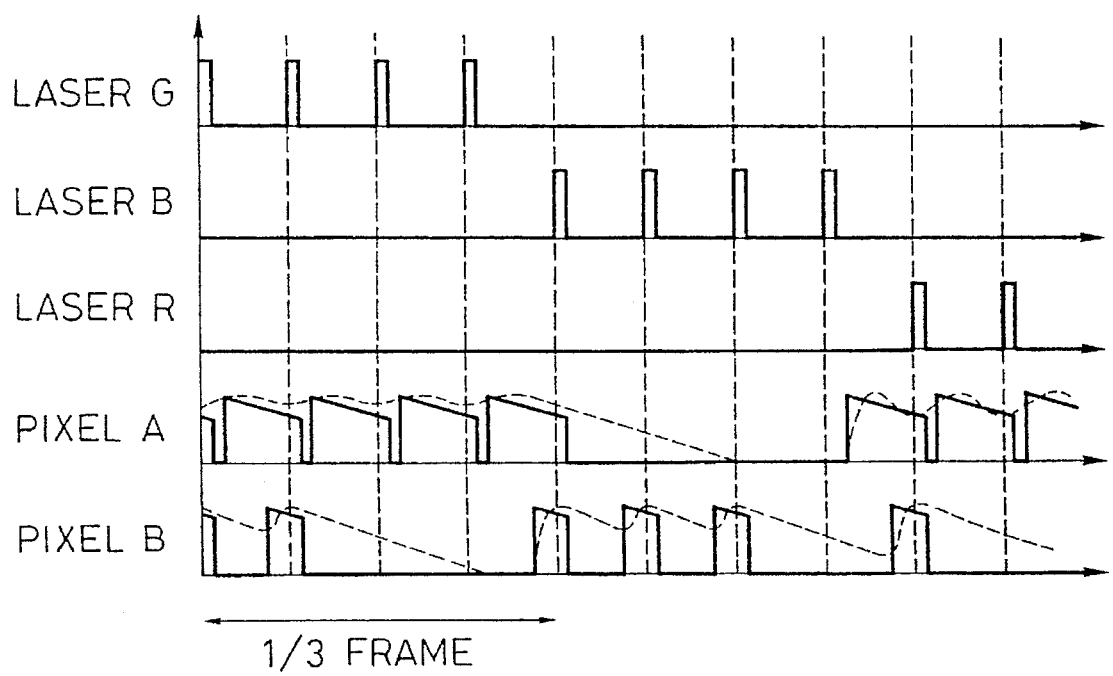
FIGS. 13(A) and 13(B) are graphical diagrams showing another method of displaying color images in accordance with the second embodiment of the present invention and a modification thereof.

FIG. 13(A) is a graphical diagram showing a digital grading. In this case, all the rows of the panel is scanned 4 times within each ⅓ frame. One laser pulse is emitted for each scanning as illustrated in the figure. Namely, four pulses are emitted for each primary color within one frame. The grading is accomplished by activating a respective pixel to selectively reflect 0 to 4 pulses of the four pulses of a respective one of the primary colors. In this case, the green pulse G is reflected 4 times on pixel A and twice on pixel B; the blue pulse B is reflected once on pixel A and 3 times on pixel B; and the red pulse R is reflected 3 times on pixel A and once on pixel B. As a result, 125 types of colors can be realized by combining pulses of the three primary colors selected to be reflected. In this regard, it should be also noted that the intensity of the reflected laser beam at respective pixels are made dull and gradually decrease due to spontaneous electric discharge as illustrated with broken lines in the figure. Of course, also on this case, the electric charge accumulated on the metallic film at each pixel is discharged by making zero the differential voltage between the conductive films in the same manner.

Figure 13B:
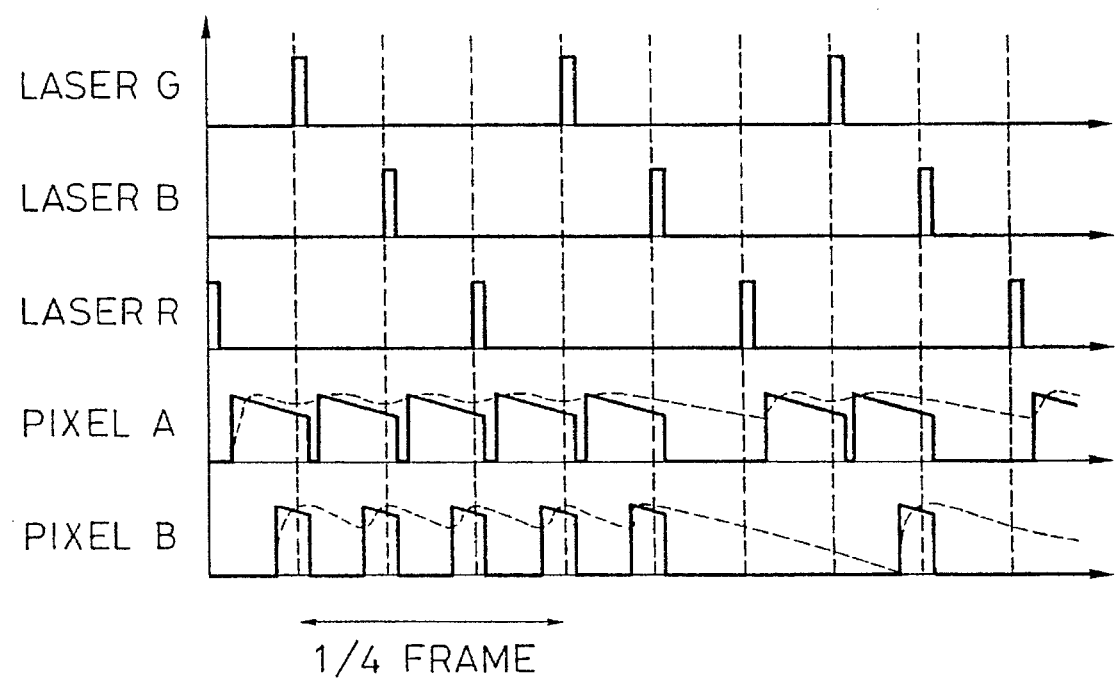

FIG. 13(B) is a graphical diagram showing a modification of the digital grading technique shown in FIG. 13(A). In this case, all the rows of the panel is scanned 3 times within each ¼ frame during which laser beams G, B and R are emitted in turn as illustrated in the figure. Namely, four pulses are emitted for each primary color within one frame. The grading is accomplished by activating a respective pixel to reflect a selected number of the four pulses of a respective one of the primary colors. In this case, the green pulse G is reflected 4 times on pixel A and twice on pixel B; the blue pulse B is reflected once on pixel A and 3 times on pixel B; and the red pulse R is reflected 3 times on pixel A and once on pixel B. As a result, 125 types of colors can be realized by combining the selected numbers of reflected pulses of the three primary colors in the same manner.

Figure 14:
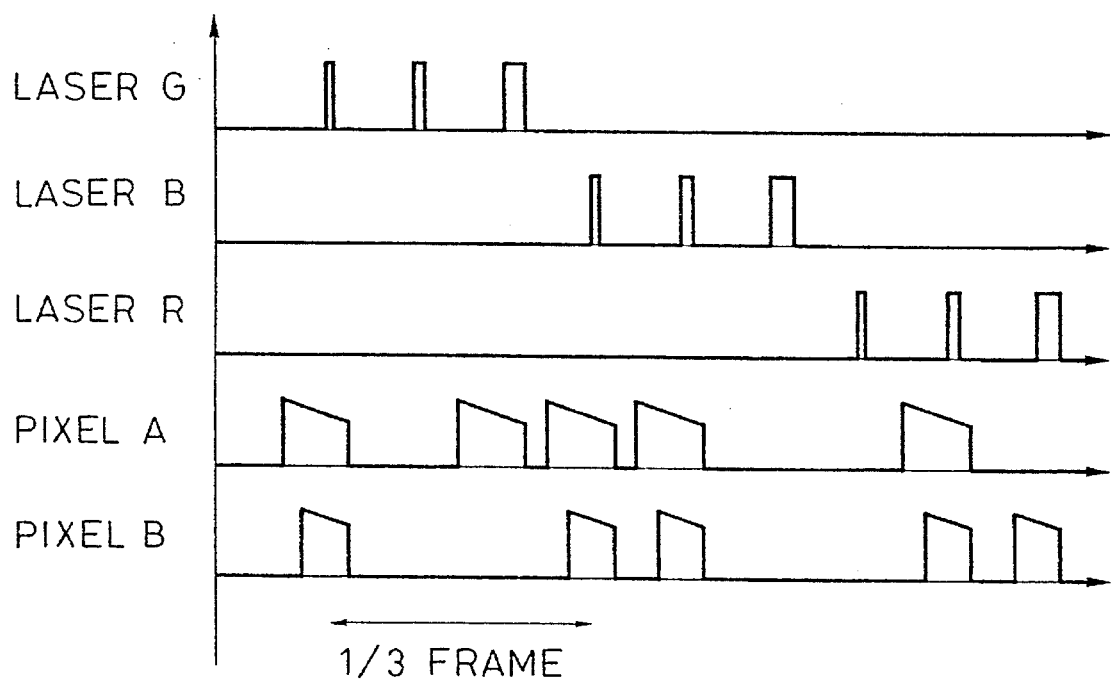
FIGS. 14(A) and 14(B) are graphical diagrams showing a further method of displaying color images in accordance with the second embodiment of the present invention and a modification thereof.
Figure 14:
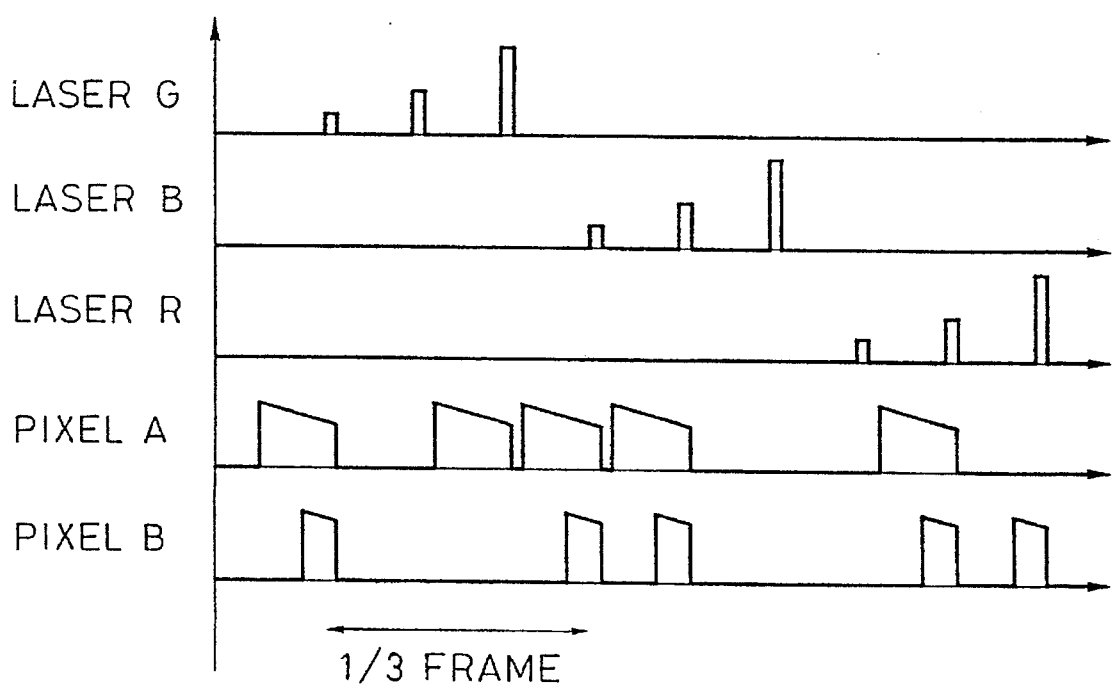

FIG. 14(A) is a graphical diagram showing another digital grading technique. In this case, all the rows of the panel is scanned 3 times within each ⅓ frame. One laser pulse is emitted for each scanning as illustrated in the figure. Namely, three pulses are emitted to the bulb for each primary color within one free. The pulse widths of the three pulses, however, are selected to be in the ratio of 1:2:4. The grading is accomplished by activating a respective pixel to selectively pass each-pulse therethrough. Namely, the total pulse width of each primary color can be arbitrarily obtained by combining three pulses from 0 to 7 in units of the width of the shortest pulse. In this case, the green pulse G is reflected for 5 time units on pixel A and for one time unit on pixel B; the blue pulse B is reflected for 3 time units on pixel A and for 3 time units on pixel B; and the red pulse R is reflected for 2 time units on pixel A and for 6 time units on pixel B. As a result, 512 types of colors can be realized by combining the selected numbers of passed pulses of the three primary colors. The different pulse widths may be determined to be in the ratio of $1:2:2^2:2^4, \ldots 2^{n-1}:2^n$ in general. FIG. 14(B) is a graphical diagram showing a modification of the digital grading technique shown in FIG. 14(A). In this case, the pulse heights of the three pulses, rather than the pulse widths, are selected to be in the ratio of 1:2:4. The effects and the performance are same as the previous example and therefore dispensed with. The different pulse heights may be generally determined in order to be in the ratio of $1:2:2^2:2^4, \ldots 2^{n-1}:2^n$.

Figure 15:
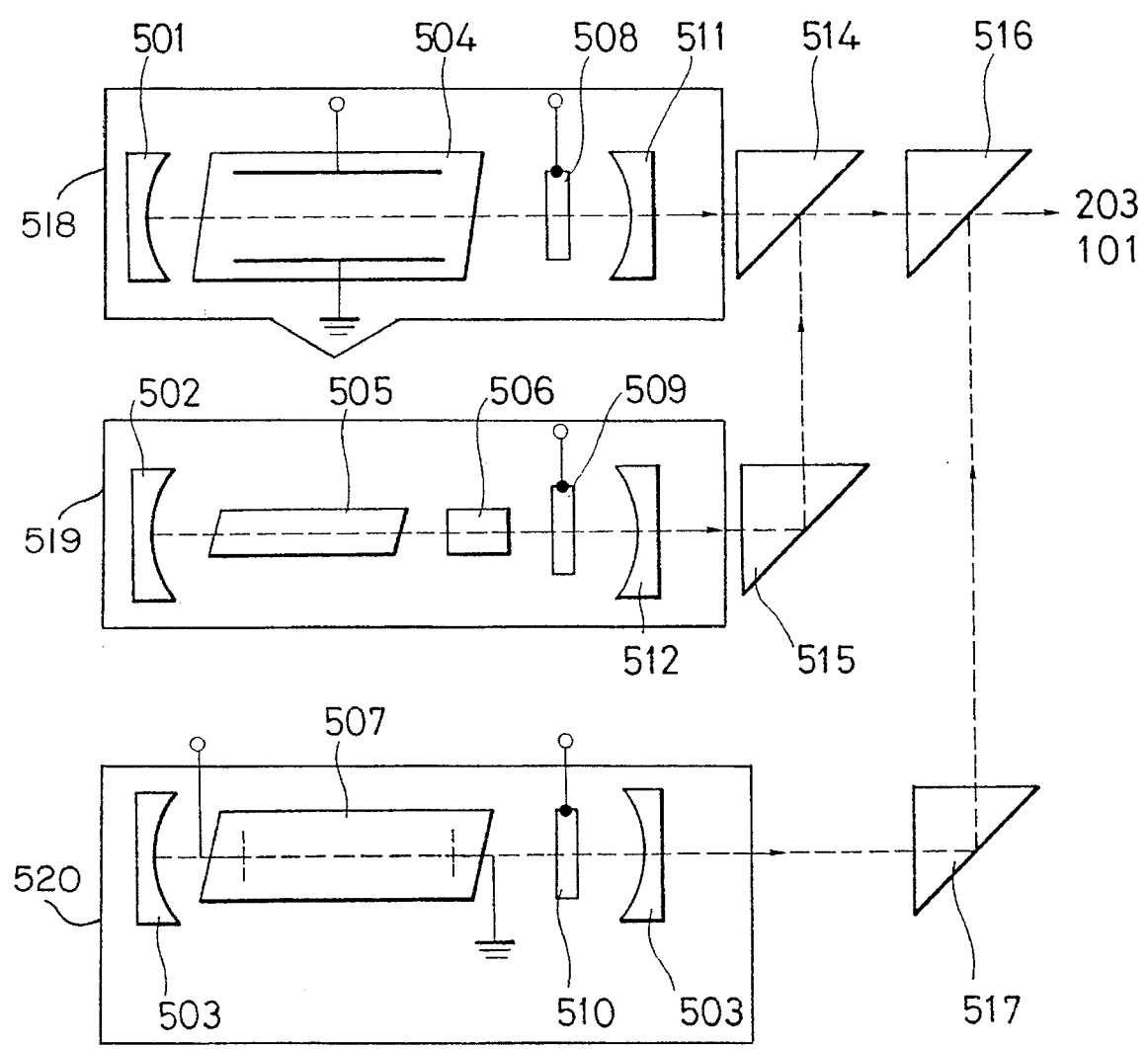
FIG. 15 is a schematic diagram showing a projection display in accordance with a third embodiment of the present invention.

Next, a third embodiment of the present invention will be explained with reference to FIG. 15. This embodiment is essentially characterized by the structure for generating laser beams of the three primary colors. The structure illustrated in FIG. 15 can be incorporated in either of the display systems as illustrated in FIGS. 5 and 9 in place of the corresponding structure of the systems to direct laser beams of the three primary colors in turns onto the same optical axis.

The structure comprises an Ar+ laser as a blue light source, a Nb:YAG laser as a green light source and a He-Ne laser as a red light source. The Ar+ laser is composed of an electric discharge tube containing Ar gas, a total reflection mirror 501 and a semi-transparent mirror 511 respectively arranged in an optical axis. The resonating frequencies of the Ar+ laser are 476.5 nm, 488 nm and 514.5 nm. If these three frequencies are mixed, the reproducibility of color is not so good so that a color filter may be provided in the downstream of the semi-transparent mirror 511 in order to eliminate components of undesirable frequencies. The Nb:YAG laser is composed of a crystal rod 505, a total reflection mirror 502 and a semi-transparent mirror 512 respectively arranged in an optical axis. A non-linear optical device 508 composed of KDP, KTP, LiNbO$_3$ or the like is provided in the downstream of the crystal rod 505 in order to obtain the second harmonic (532 nanometers) of the basic wave (1.06 micrometers). The non-linear optical device 506 may be composed of an organic material. The resonation of the laser may be initiated by a Krypton arc lamp or a semiconductor laser capable of emitting near infrared rays. In the case of the semiconductor laser, the system is made compact and the cooling is easy. The He-Ne laser is composed of an electric discharge tube 507 containing He and Ne, a total reflection mirror 503 and a semi-transparent mirror 513 respectively arranged in an optical axis.

In order to form pulsed beams, Pockels cells 508, 509 and 510 are provided on the respective axes in the upstream of the semi-transparent mirrors 511, 512 and 513 respectively. The Pockels cells are switched by electrical signals given in synchronism with the operation of the CRT or the liquid crystal panel as described above. Green and Blue laser beams emitted from the Nb:YAG laser and the He-Ne laser are reflected by prisms 515 and 517 having reflection surfaces on slanting sides thereof and prisms 514 and 516 having semi-transparent reflective surfaces on slanting sides in order to lead laser beams of the three primary colors onto the same optical path. Although laser beams of the three primary colors form a white light if emitted simultaneously, these beams of the three primary colors are utilized in turn as monochromatic light as discussed supra.

Next, a fourth embodiment of the present invention will be explained with reference to FIG. 18. This embodiment is also essentially characterized by the structure for generating laser beams of the three primary colors. The structure illustrated in FIG. 16 can be incorporated in either of the display systems as illustrated in FIGS. 5 and 9 in place of the corresponding laser beam emitting structure of the systems to direct laser beams of the three primary colors in turns onto the same optical axis.

Figure 16:
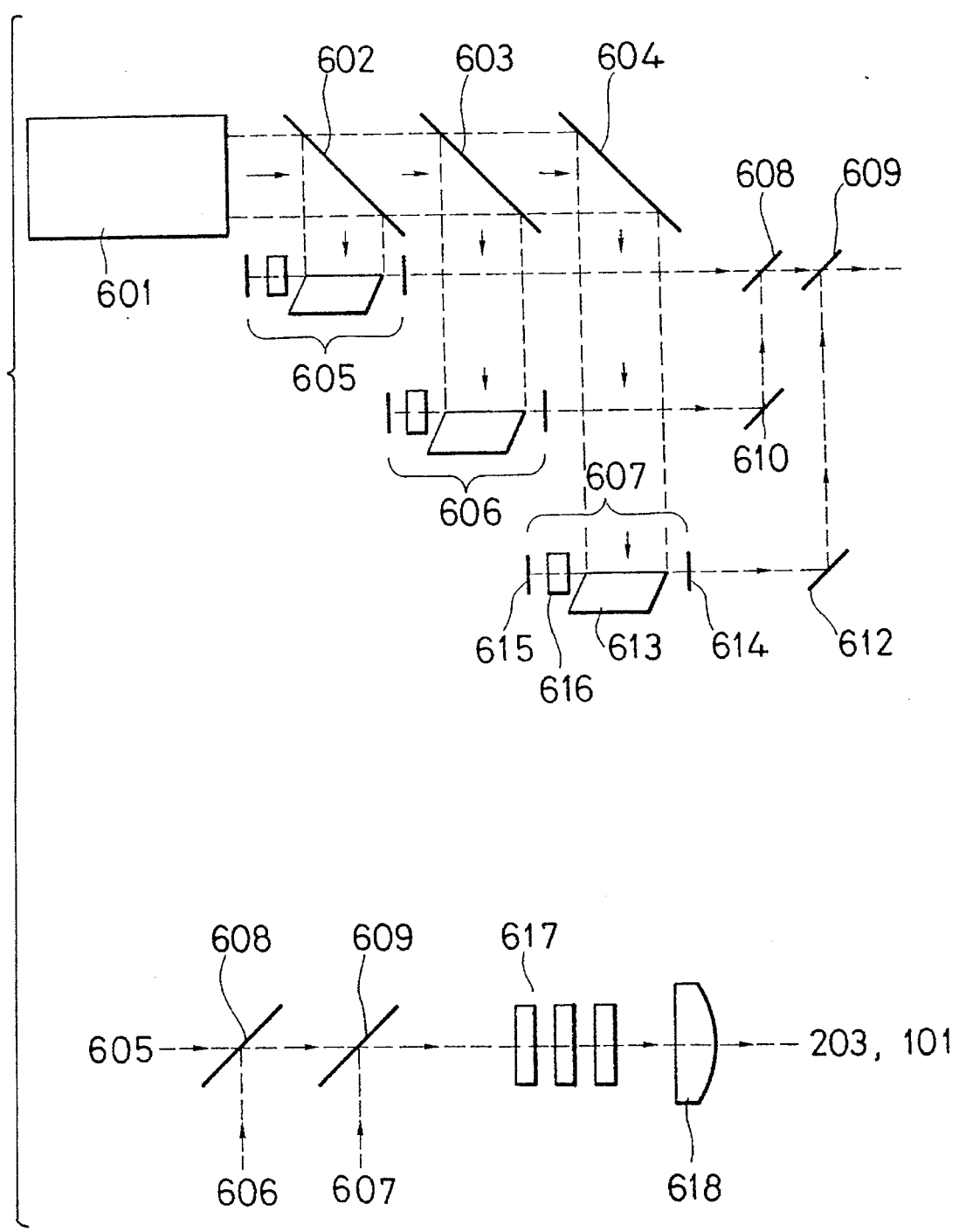
FIG. 16 is a schematic diagram showing a projection display in accordance with a fourth embodiment of the present invention.

The structure comprises a nitrogen laser 601, three dye lasers 605, 606 and 607 and several mirrors as illustrated in FIG. 16. A nitrogen laser can be formed in a compact design and is capable of emitting pulsed laser beams having pulse widths of the order of 10 nanoseconds and wavelength of the order of 330 nanometers. Dye lasers are generally known as lasers resonated by input of several types of ultraviolet laser rays and flashes of a flash lamp and capable of emitting laser beams having variable wavelengths. The wavelength of the laser beams can be changed by changing the dye stuff employed. The excitation of a plurality of lasers can be accomplished by the same energy source, unlike the case shown in FIG. 15 in which the energy sources are a lamp and electric discharge. Each dye laser comprises a dye cell 613, a semi-transparent mirror 614, a total reflection mirror 615 and an optical shutter 616. The optical shutter 616 is composed of an etalon (a wavelength selection device) and a Pockels cell. Since the spectral bandwidth of the dye laser is relatively broad, the etalon is interposed to limit the resonating frequency. The Pockels cell is provided for selectively halting the resonation. The dye cell of the dye laser 605 comprises rhodamine B. The dye cell of the dye laser 606 comprises sodium fluorescein. The dye cell of the dye laser 607 comprises 7-hydroxycoumarin.

Laser beams emitted from the nitrogen laser 601 are transmitted through semi-transparent mirrors 602 and 603 and reflected on the semi-transparent mirrors 602 and 603 and a total reflection mirror 604 in order to enter the dye cells of the three dye lasers 605, 606 and 607. Each dye laser causes resonation in response to the inputted laser beam and emits a monochromatic laser beam. Laser beams emitted from the dye lasers 605, 606 and 607 are directed onto the same optical axis by means of total reflection mirrors 610 and 612 and semi-transparent mirrors 606 and 609. The frequency of the pulsed discharge of the nitrogen laser 601 is adjusted at a suitable frequency for the image processing of the CRT or the liquid crystal panel. For example, in the case that 30 frames are formed per second with 8 grades by the grading method shown in FIG. 8(B), the resonation repetition frequency of the nitrogen laser is selected to be 270 Hz(=30 frame/sac×3 colors×3 pulses/color). The resonations of the dye lasers 605, 606 and 607 are controlled by means of the optical shutters to emit a laser beam of only one color at the same time and in synchronism with the operation of the light bulb 203 or the liquid crystal panel 101. Each pulse of the monochromatic laser beam is then passed through an optical device 617 consisting of three optical shutters and an convex lense 618 to expand the pulse in advance of entering the light bulb 203 or the liquid crystal panel 101.

The optical device 617 functions to lessen the brightness of the laser pulse. Each shutter is made of a liquid crystal panel and formed with a number of fine optical apertures whose total area is 50% of the entirety of the shutter to have a transmission factor of 50% even in its off-condition (closed condition). When one shutter is turned off and the others turned on, the total transmission factor of the three shutters is decreased to ½ of that when all the shutters are turned on. When two shutters are turned off and the other turned on, the total transmission factor of the three shutters is decreased to ¼ of that when all the shutters are turned on. By this structure, the grading method as illustrated in FIG. 8(B) can be carried out.

In the above case, care must be taken for the transparency of the optical device 617. Since the laser beam is very strong light, optical energy thereof tends to be concentrated to a possible translucent portion of the device, burned out the portion and destruct the entire device resulting from the portion. Accordingly, appropriate consideration must be paid to the strength of the laser beam (the power density and the energy density) and the endurance of the optical device. For example, when a laser beam of 1 mm diameter is expanded and projected onto a 1 meter screen, the energy of the laser beam is 100 times higher than that of a conventional projection display utilizing a light beam of 1 cm diameter. If the laser beam consists of pulses of 100 nanoseconds pulse width, the peak output is $10^9$ times higher than that of a conventional projection display utilizing a continuous light. Accordingly, if a problem is raised with the high energy of the laser beam, the order of the optical device 617 and the lense 618 is inverted. Namely, if the beam diameter is expanded by a factor of 10 in advance of entering the optical device 617, the energy density of the laser beam is reduced by a factor of 100.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A method of displaying images by means of an electro-optical system comprising a laser capable of emitting pulsed laser beams and a two-dimensional optical switch for modulating said pulsed laser beams, wherein graded images are formed by periodically changing the pulse width of the laser beams before said laser beams enter into said two-dimensional optical switch.

2. A method of displaying images by means of an electro-optical system comprising a laser capable of emitting pulsed laser beams and a two-dimensional optical switch for modulating said pulsed laser beams, wherein graded images are formed by periodically changing the pulse height of the laser beams before said laser beams enter into said two-dimensional optical switch.

3. A method of forming an image comprising the steps of:

preparing a plurality of lasers, wherein each of said lasers is capable of producing a laser beam having a different color from each other, respectively;

producing laser beams from said plurality of lasers in turn in a time sharing mode;

directing said laser beams to a two-dimensional optical switch; and modulating said laser beams by said two-dimensional optical switch.

4. The method of claim 3 wherein said two-dimensional optical switch comprises a liquid crystal device.

5. The method of claim 3 wherein said plurality of lasers emits a red laser beam, a green laser beam and a blue laser beam, respectively.

6. A method of forming an image comprising the steps of:

preparing a plurality of lasers, wherein each of said lasers is capable of producing a pulses laser beam having a different color from each other, respectively;

producing laser beams from said plurality of lasers periodically in a time sharing mode;

directing said laser beams to a two-dimensional optical switch; and modulating said laser beams by said two-dimensional optical switch, wherein said laser beams comprises a predetermined number of laser pulses having a different pulse width from one another.

7. A method of forming an image comprising the steps of:

preparing a plurality of lasers, wherein each of said lasers is capable of producing a pulsed laser beam having a different color from each other, respectively;

producing laser beams from said plurality of lasers periodically in a time sharing mode;

directing said laser beams to a two-dimensional optical switch; and modulating said laser beam by said two-dimensional optical switch, wherein said laser beams comprises a predetermined number of laser pulses having a different pulse height from one another.

* * * * *